US012358527B1

(12) United States Patent
Seminara et al.

(10) Patent No.: US 12,358,527 B1
(45) Date of Patent: Jul. 15, 2025

(54) PROCESSOR AND SENSOR ARRAY FOR AUTONOMOUS TRUCK

(71) Applicant: Outrider Technologies, Inc., Brighton, CO (US)

(72) Inventors: Gary Michael Seminara, Golden, CO (US); James Christopher McKenna, Littleton, CO (US); Michael Patrick Cutter, Golden, CO (US); Jonathan Record, Highlands Ranch, CO (US); Dale Dee Rowley, Highlands Ranch, CO (US); Keith Massie, Arvada, CO (US); Alexander Fink, Pflugerville, TX (US); Critt Coburn, Westminster, CO (US); Gary McKinney, Colorado Springs, CO (US); Lawrence S. Klein, Bend, OR (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

(21) Appl. No.: 18/655,918

(22) Filed: May 6, 2024

Related U.S. Application Data

(63) Continuation of application No. 17/511,087, filed on Oct. 26, 2021, now Pat. No. 11,975,737.

(Continued)

(51) Int. Cl.
*B60W 60/00* (2020.01)

(52) U.S. Cl.
CPC ....... *B60W 60/001* (2020.02); *B60W 2300/12* (2013.01); *B60W 2420/403* (2013.01); *B60W 2420/408* (2024.01)

(58) Field of Classification Search
CPC ........... B60W 60/001; B60W 2300/12; B60W 2420/42; B60W 2420/52
See application file for complete search history.

(56) References Cited

U.S. PATENT DOCUMENTS 9,994,152 B1 * 6/2018 Hess ..................... G01S 13/931
11,703,861 B1 * 7/2023 Paschall .............. G05D 1/0234
701/26

(Continued)

FOREIGN PATENT DOCUMENTS

CN 210634468 U 5/2020

OTHER PUBLICATIONS

Machine Translation of CN-210634468-U retrieved from Clarivate Analytics on Apr. 8, 2023 (Year: 2023).

*Primary Examiner* — Thomas Ingram
(74) *Attorney, Agent, or Firm* — Loginov & Associates, PLLC; William A. Loginov

(57) ABSTRACT

This provides locations for mounting controllers and processing components that effectively employ the roof within a frame covered by a cowling so as to avoid exposure to weather and the environment. The roof is also employed to provide a sensor bar that extends across the vehicle width for a distance that does not interfere with normal vehicle function or generate potential overhangs, which can inadvertently engage objects or vehicles. The bar is sufficient in size and shape so as to allow mounting of a plurality of types of sensors on its top surface and/or recessed within front or rear edges. Such sensors can include visual light cameras for machine vison processes and/or LIDAR of various types and cooperage areas/fields of view—some of which can be recessed within a hollow region of the bar. Additional sensors can be mounted on the truck cab and/or chassis, including visual-light cameras and radars.

20 Claims, 24 Drawing Sheets

Related U.S. Application Data

(60) Provisional application No. 63/105,734, filed on Oct. 26, 2020.

(56) References Cited

U.S. PATENT DOCUMENTS

| | | | | |
|---|---|---|---|---|
| 2007/0291130 | A1* | 12/2007 | Broggi | H04N 23/90 |
| | | | | 348/E13.015 |
| 2008/0161986 | A1* | 7/2008 | Breed | G01S 19/51 |
| | | | | 701/23 |
| 2012/0143430 | A1* | 6/2012 | Broggi | G01S 17/931 |
| | | | | 348/148 |
| 2019/0302764 | A1* | 10/2019 | Smith | G05D 1/0088 |
| 2021/0314497 | A1* | 10/2021 | Nemeth | H04N 23/90 |
| 2023/0089733 | A1* | 3/2023 | Avram | G01S 17/86 |
| | | | | 701/28 |

* cited by examiner

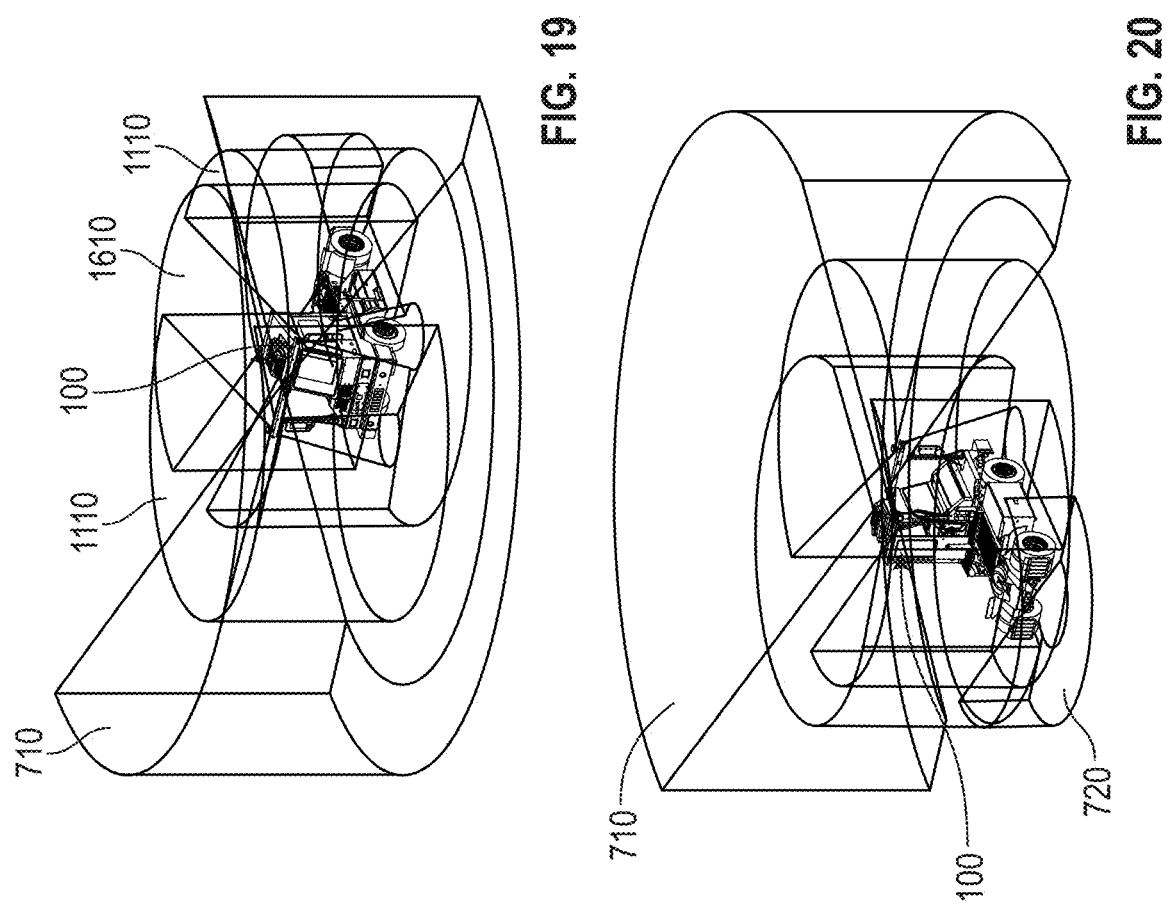
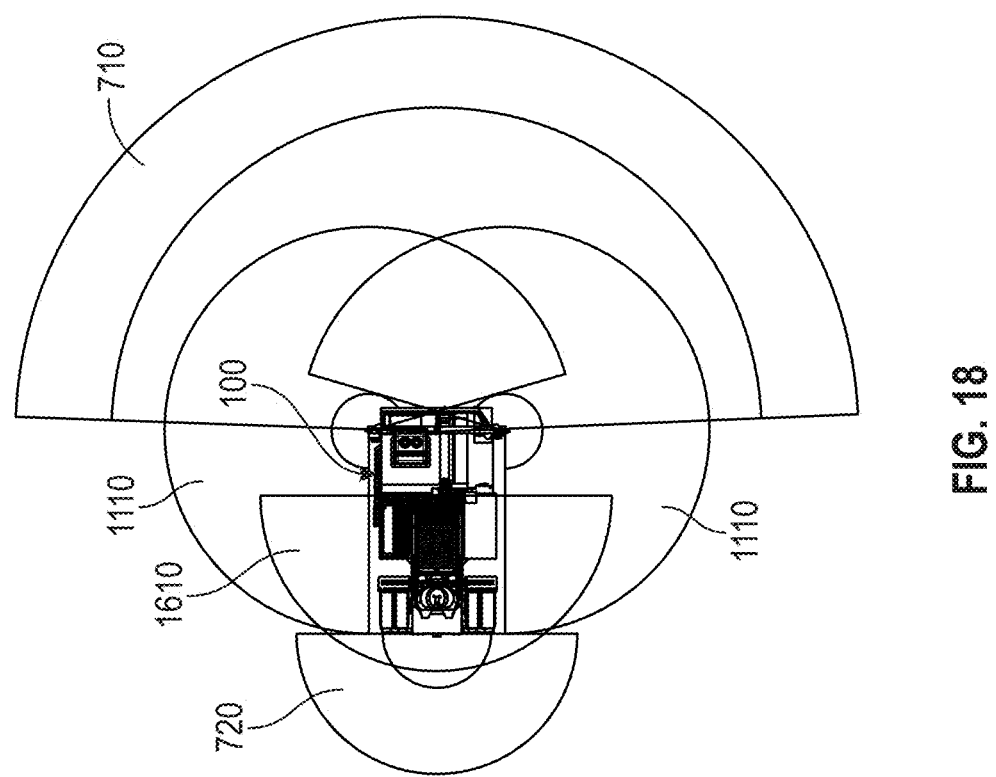

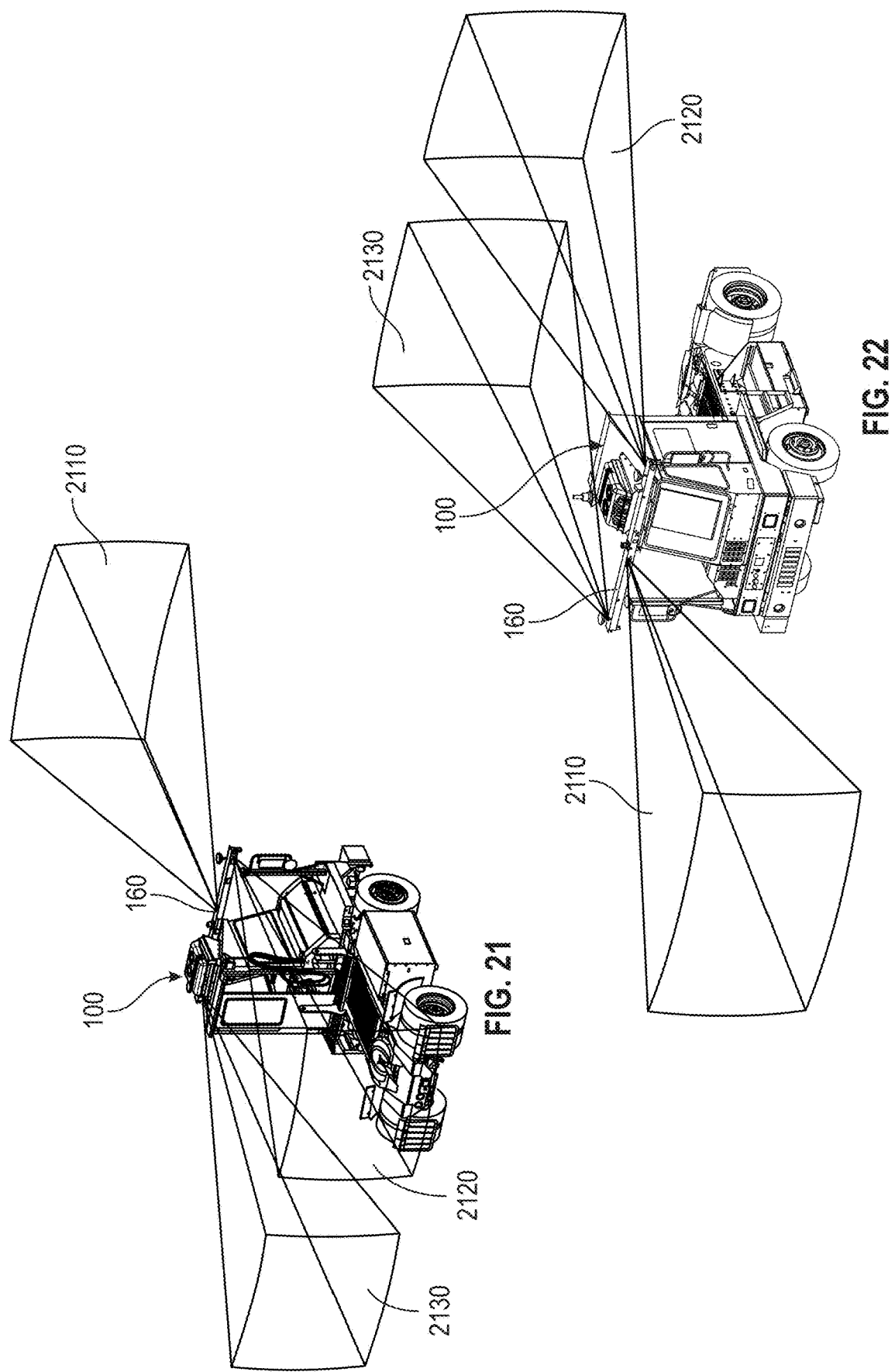

PROCESSOR AND SENSOR ARRAY FOR AUTONOMOUS TRUCK

RELATED APPLICATIONS

This application is a continuation of co-pending U.S. patent application Ser. No. 17/511,087, entitled PROCESSOR AND SENSOR ARRAY FOR AUTONOMOUS TRUCK, filed Oct. 26, 2021, which claims the benefit of U.S. Provisional Application Ser. No. 63/105,734, entitled PROCESSOR AND SENSOR ARRAY FOR AUTONOMOUS TRUCK, filed Oct. 26, 2020, the entire disclosure of each of which applications is herein incorporated by reference.

FIELD OF THE INVENTION

This invention relates to autonomous vehicles, and more particularly to processing and sensing systems for use in controlling operation of autonomous trucks.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer.

A wide range of solutions have been proposed over the years to automate one or more processes of a truck, thereby reducing or eliminating the input labor needed by a driver. In one application, trucks that are used to shunt trailers around a yard between storage/parking locations and loading/unloading docks. Such vehicles are generally termed "yard trucks" and can be powered by fossil fuels or electricity in various configurations. Various novel autonomous vehicle implementations and function associated with autonomous vehicle yard trucks (herein termed "AV yard trucks"), are described in commonly assigned U.S. patent application Ser. No. 16/282,258, entitled SYSTEMS AND METHODS FOR AUTOMATED OPERATION AND HANDLING OF AUTONOMOUS TRUCKS AND TRAILERS HAULED THEREBY, filed Feb. 21, 2019, and related applications thereto, the teachings of which are expressly incorporated herein by reference by way of useful background information.

As autonomous trucks require significant data and telemetry of various kinds—visible and near-visible light radar, LIDAR, GPS, digital data communications, and the like, as well as various forms of processing devices, appropriate mounting and sensor placement is critical. These sensors, antennas, processors and other electronic devices should be properly mounted and positioned to allow for clear data and light pathways and all-weather operation.

SUMMARY OF THE INVENTION

This invention overcomes disadvantages of the prior art by providing locations for mounting controllers and processing components that effectively employ the roof of an AV truck in a manner that does not interfere with normal operation or excessively increase vehicle height. The components are well positioned for cooling and are covered in an accessible manner by a cowling so as to avoid exposure to weather and the environment. The roof is also employed to provide, adjacent to a top front edge thereof, a sensor bar that extends across the vehicle width for a distance that does not interfere with normal vehicle function or generate potential overhangs, which can inadvertently engage objects or vehicles. The bar is sufficient in size and shape so as to allow mounting of a plurality of types of sensors on its top surface and/or recessed within front or rear edges. Such sensors can include visual light cameras for machine vison processes and/or LIDAR of various types and cooperage areas/fields of view (FOVs)—some of which can be recessed within a hollow region of the bar. Additional sensors can be mounted on the truck cab and/or chassis, including visual-light cameras and radars.

In an illustrative embodiment, an autonomous vehicle (AV) truck having a chassis, cab and cab roof includes a sensor mounting bar, mounted adjacent to a front top edge of the cab, the sensor mounting bar including a plurality of sensors mounted thereon so as to cover a plurality of points of view relative the AV truck. The plurality of sensors can include visual camera sensors and LIDAR sensors. The sensor mounting bar can define a hollow structure and at least one of plurality of sensors is recessed thereinto. Illustratively, opposing ends of the sensor mounting bar can support at least some of the LIDAR and visual camera sensors at a desired orientation. Each of the opposing ends of the sensor mounting bar can include, mounted thereon, at least some of the visual camera sensors are directed at least one of forwardly, rearwardly and sideways relative to dimensions of the AV truck, and at least one LiDAR sensor on each of the opposing ends. At least some of the plurality of sensors can be located with respect to a top surface of the sensor mounting bar. The opposing ends of the sensor mounting bar can be arranged overhang top side edges of the cab in manner free-of interference with exterior obstructions. The opposing ends of the sensor mounting bar can be spaced apart at between approximately 115 and 120 inches in an exemplary embodiment. The cab can support, adjacent to a top rear, at least one rear-facing visual camera sensor. A cab roof-mounted rack that can be provided to support a plurality of controller and processor electronics packages, which support autonomous control an operations by the AV truck, operatively connected to the plurality of sensors, the rack being covered by a weatherproof cowling. At least one rear-facing visual camera sensor can be located adjacent to a rear bumper of the chassis. At least four radar sensors can be located on each of a front, rear and opposing sides of the chassis at approximately 90-degree facing offsets therebetween. The radar sensors can define a larger/wider arcuate coverage region at a closer distance, and a smaller/narrower arcuate coverage region at a further distance, from the respective of the radar sensors. The plurality of visual camera sensors include close proximity visual camera sensors and longer range visual camera sensors directed in approximately similar directions. At least one of the plurality of sensors can be directed rearwardly and operatively connected with processors arranged to hitch, unhitch, connect and disconnect service lines with respect to the a trailer.

The plurality of visual camera sensors can provide image data to a machine vision system that recognizes imaged features and can provide imaged features to autonomous controllers that direct motion and operation of the AV truck.

In an illustrative embodiment, an autonomous vehicle (AV) truck having a chassis, cab and cab roof can include a cab roof-mounted rack that supports a plurality of controller and processor electronics packages, that support autonomous control and operations by the truck, operatively connected to the plurality of sensors, the rack being covered by a weatherproof cowling.

BRIEF DESCRIPTION OF THE DRAWINGS

The invention description below refers to the accompanying drawings, of which:

FIGS. 18-20 are respective top, front-oriented perspective and rear-oriented perspective views of the AV yard truck of FIG. 1 showing combined coverage for the various LIDAR and Waymo-based LIDAR sensors of FIGS. 7-14 and 16-171;

FIGS. 21-24 are respective rear-oriented perspective, front-oriented perspective, side and top views of the AV yard truck of FIG. 1 showing FOVs for a plurality of visual camera sensors and associated optics;

DETAILED DESCRIPTION

I. Vehicle Overview

Figure 1:
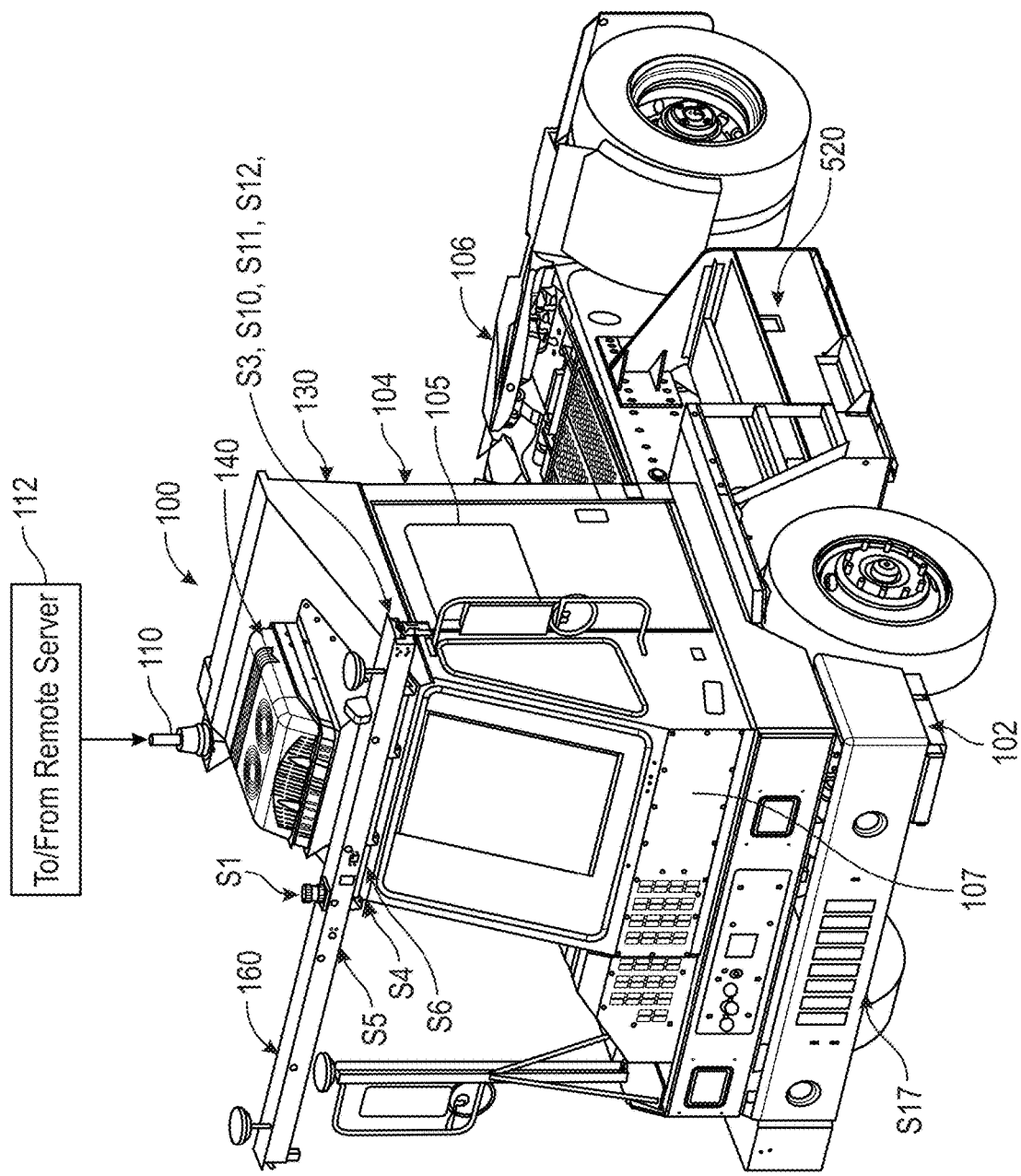
FIG. 1 is a front-oriented perspective view of an AV yard truck with roof mounted controller and processor electronics and various sensors, including a roof-mounted sensor mounting bar according to an exemplary embodiment.
Figure 2:
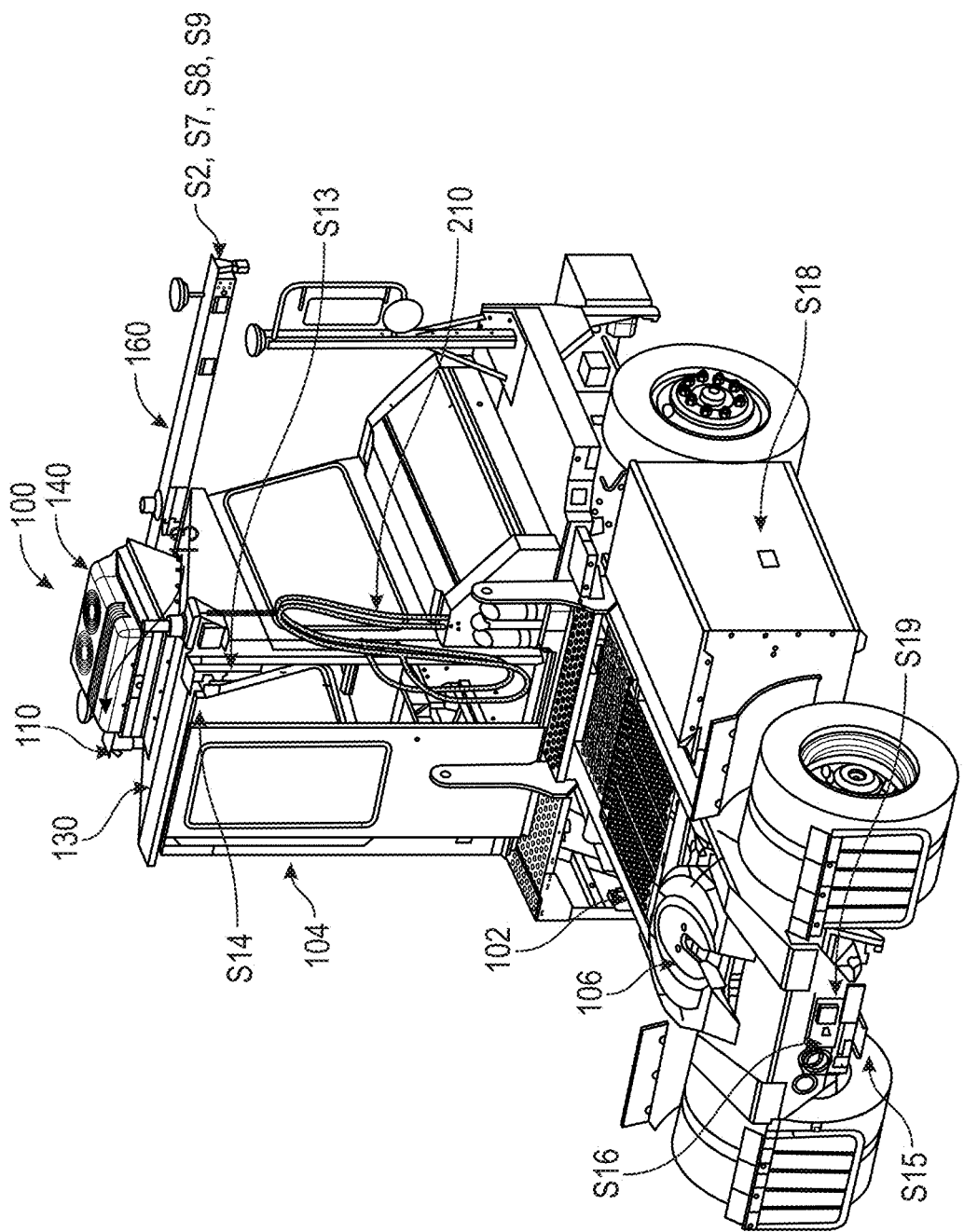
FIG. 2 is a rear-oriented perspective view of the AV yard truck of FIG. 1.

FIGS. 1 and 2 show an exemplary autonomous vehicle (AV) yard truck 100 that can operate on charge electric batteries, or alternatively, an internal combustion engine. The exemplary AV truck is adapted for use inside a shipping yard to transport trailers between zones and loading/unloading locations in a manner understood by those of skill in operating such facilities. The principles herein are variously applicable to a variety of AV yard trucks and trucks used for other operations-such as OTR trucks, agricultural vehicles and construction vehicles. The term AV truck can be taken broadly to include any such vehicle unless otherwise limited to reference an AV yard truck.

As shown in FIGS. 1 and 2, the exemplary AV truck 100 includes a chassis 102 and cab or other enclosing structure 104. In this example, the cab 140 includes a conventionally sized door 105 for access by an optional human driver, and associated conventional controls, such as a steering wheel, brake and accelerator pedal, instruments, manual control switches, pneumatics for lights, etc., emergency/parking brake lever and/or gearshift lever (all not shown) can be provided for optional human control. The rear end of the chassis includes a fifth wheel assembly 106 adapted to engage and tow the kingpin of a conventional trailer (not shown) arrangement in a manner clear to those of skill. The chassis rear can also include various mechanisms (not shown, but described by way of example, in U.S. patent application Ser. No. 16/282,258) for attaching glad hands and/or other air and electrical trailer-service (brake) lines 210 (FIG. 2) to the trailer. These mechanisms can include various robotic control systems, end effectors, adaptors, etc., that are managed by the on-board processors of the AV truck 100.

The cab 104, and other locations about the truck, 100, such as the front panel 107 can include various controllers, processors and electronics, to be described further below. The controllers and processors enable autonomous operation. Such operation can be provided via internal/on-board control systems, which receive control and data information wirelessly (using the appropriate RF frequencies and protocols) through a vehicle mounted transceiver and associated antenna 110 that communicates with one or more facility computer server(s) 112.

II. Roof Arrangement of Control and Processor Components

Figure 3:
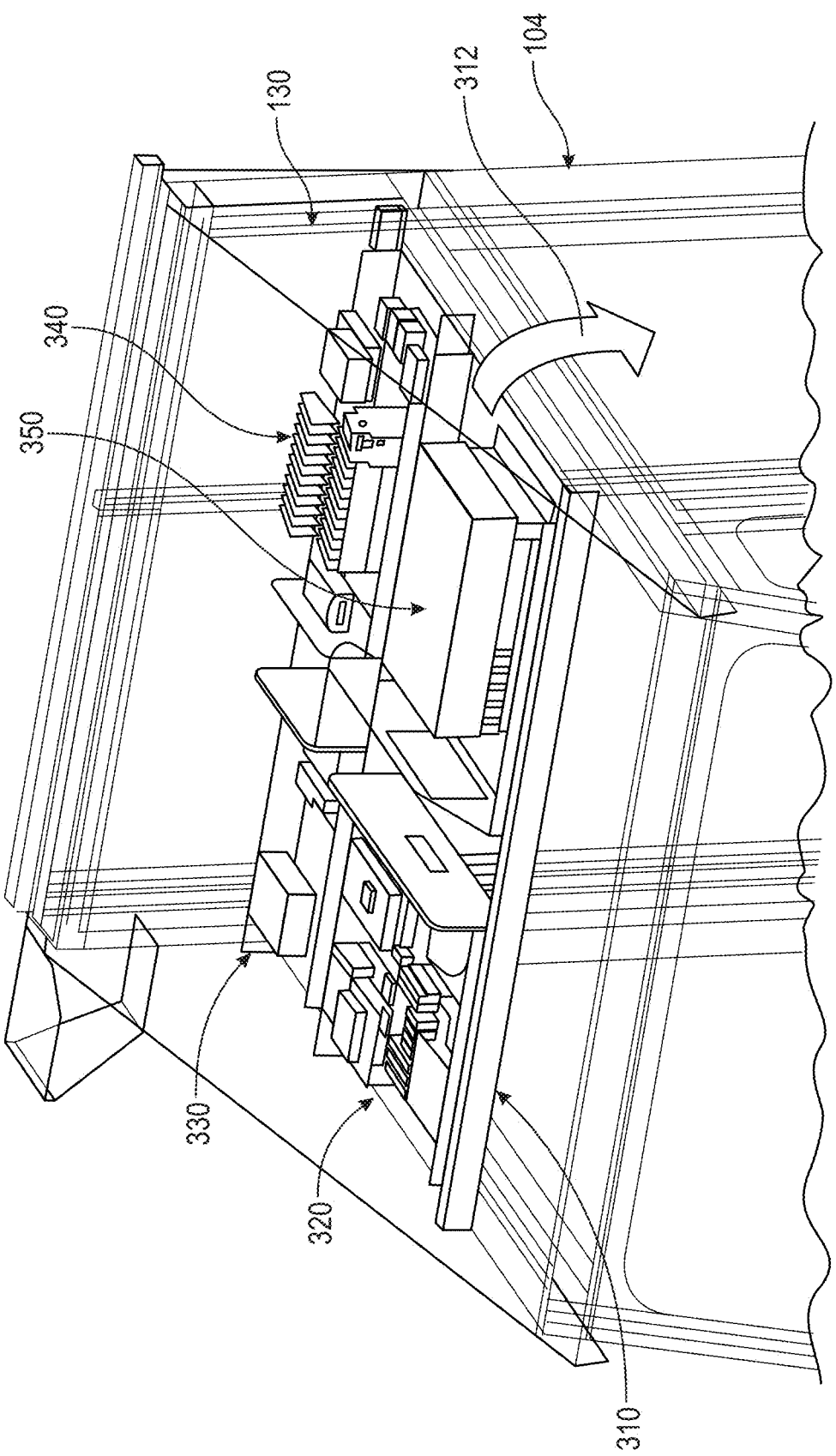
FIG. 3 is an exposed, fragmentary perspective view of the roof of the AV yard truck of FIG. 1 showing a mounting for controller and processor electronics packages.

It is noted that the depicted AV yard truck 100 (FIGS. 1 and 2) in this exemplary embodiment, can be adapted from a commercially available, non-autonomous yard truck. As such, the top of the cab 104 of such a yard truck provides a useful area for mounting of various processing and control components that are particularly adapted to facilitate AV operation. These components are contained in a wedge-shaped cowling 130, which can be constructed from composite (e.g. fiberglass, carbon fiber), durable polymer, sheet steel or sheet aluminum). The cowling 130 is further shown in an exposed view in FIG. 3. The cowling 130 is either removable for access to the interior, or can include an appropriately sized and shaped access panel or hatch. The cowling 130 is wedge shaped in this embodiment, both for aesthetic and aerodynamic purposes. It can be arranged to allow for an air-conditioning/cooling of the components, or another instrumentation unit (140 in FIGS. 2 and 3) to be mounted over or in front if the enclosed space. Note that the depicted cowling can be a standard part of a commercially available yard truck—for example that provided by Kalmar Ottawa of Ottawa, KS, in which case it is adapted as appropriate for access of the components described herein. In alternate embodiments, custom or commercially available yard trucks with flat roofs or other cab roof configurations can be provided with a custom cowling or other cover for the roof-mounted components provided according to the embodiments herein. This custom cowling can define a variety of shapes, in addition to the depicted wedge, in alternate embodiments. The cowling, in any configuration or embodiment contemplated herein, provides sufficient interior volume to enable enclosure of the components described below. The cowling 130 contains, in a weather-protective manner, a support framework 310 that provides an appropriately shock and electrically insulated base for a series of electronic processing component clusters/packages 320, 330, 340 and 350 that facilitate autonomous operation, including navigation and presence sensing, among other functions. By way of non-limiting example, the depicted packages on the framework 310 include, but are not limited to, the sensor/antenna (AN) processors 320 that are used to provide decision-making based upon inputs from various perception sensors mounted around the vehicle (and described below); a Wi-Fi communications plate and emergency stop (estop) system 330; a system interlock and data logging system 340; and a data drive for camera and radar data (commercially available from NVDIA). The layout and composition of such components is highly variable in various exemplary embodiments. As shown (arrow 312), these components are electrically connected, via appropriate communication links (wired and/or wireless) to drive controllers for the vehicle, which operate (e.g.) steering, motion, braking and various service line connection mechanisms.

Figure 4:
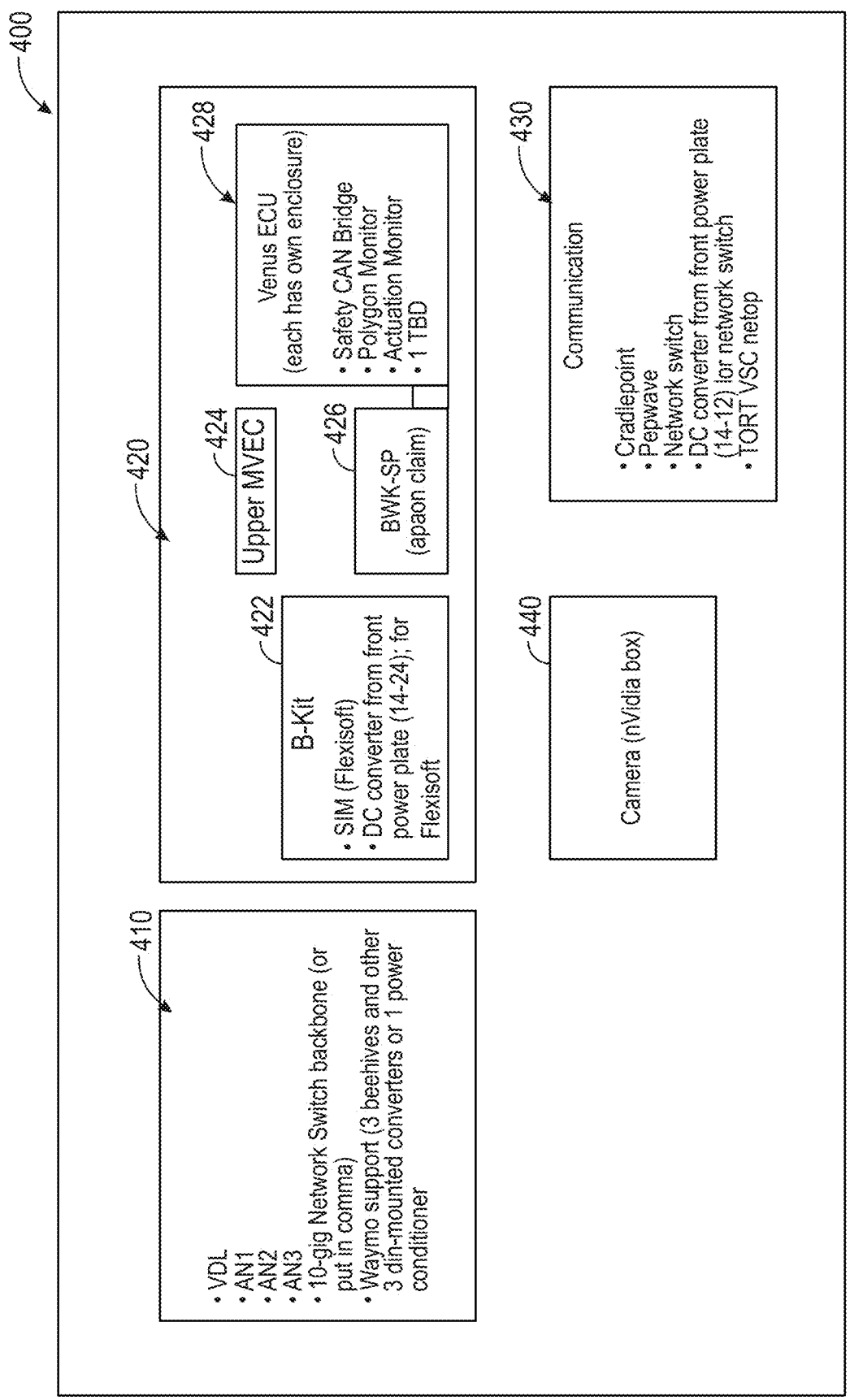
FIG. 4 is a block diagram showing exemplary electronics and functions thereof with respect to the roof-mounted electronics packages of FIG. 3.

The roof-mounted components 320, 330, 340 and 350 within the framework/rack 310 can be functionally organized according to the exemplary arrangement 400 of FIG. 4. For example, an component set 410 (also termed the A-kit) can be responsible certain for RF and other communications interfaces, including, but not limited to VHF data link (VDL), Antennas (AN1-AN3), a TCP/IP network switch (10-gigabit, for example) and a Waymo support module (associated with Waymo (Alphabet, Inc. of Mountain View CA) used to operate a Waymo technology-based, commercially available autonomous driving system. Note that such systems specify particular sensor arrangements (described below), power and data handling capabilities. The depicted arrangement 400, and other controls/processors provided at various locations around the truck 100 are adapted to support this technology. It is expressly contemplated that alternate commercially available and/or customized autonomous vehicle technology can be employed—such as that employed by certain automobile manufacturers (e.g. Tesla Motors, Inc. of Palo Alto, CA).

The arrangement 400 includes another electronic component package (a termed herein the B-kit). This package 420 include a power handling unit 422, Upper MVEC 424, which controls power distribution to other components via processor commands, By-Wire-Kit (BWK)-SP 426 vehicle controller/processor and a Venus engine control unit (ECU) 428. A communication package 430 is provided, including an estop radio, Wi-Fi radio, and appropriate wireless communications arrangements. Additionally, a camera control processor/video card(s) 440, such as those available from NVIDIA of Santa Clara, CA, can be provided to handle image data acquired from one or more machine vision/pattern-recognition based navigation cameras.

The roof of the cab 104 can also support (external of the cowling 130) various navigation antennas (e.g. GPS, inertial navigation, etc.), such as the BX922 dual antenna receiver from Trimble of Sunnyvale, CA (not shown).

Note that any of the specific commercially available components herein (e.g. processors, interfaces, sensors, etc.) are specified as a particular make and model only by way of example of devices with general performance characteristics and functions that can operate sufficiently to carry out the operations of the exemplary embodiments hereon. It is expressly contemplated that other commercially available or custom components of differing makes or models can be used in alternate embodiments. More generally, any arrangement that provides similar or improved (or where appropriate, reduced) performance can be substituted for the exemplary commercially available components described herein.

III. Sensor Array Support and Placement

With reference again to the exemplary AV yard truck 100 of FIGS. 1 and 2, it is contemplated that the exterior of the truck carries a variety of sensor types, both passive and active, to facilitate autonomous navigation. These sensors are positioned in a manner that provides appropriate field of view (FOV) to acquire and deliver the desired sensor telemetry to the AV processing components (e.g. arrangement 400) and allow for damage free operation given the yard environment. That is, the sensors are placed so as to avoid obstruction due to weather—such as rain and snow, and impacts from various obstacles and structures (fixed and moving) normally found in a yard environment. In various implementations, sensors should be located at a sufficient elevation to provide a desired perspective and range.

Figure 5:
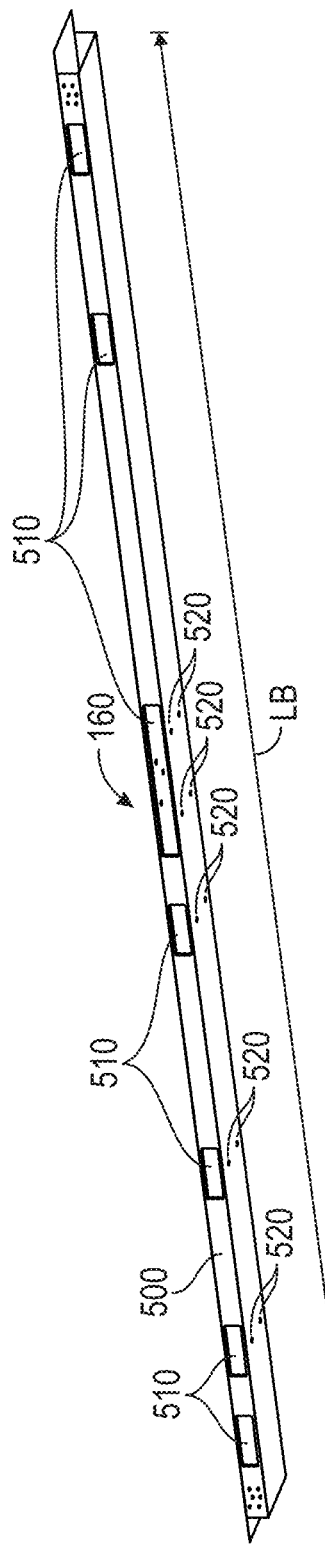
FIGS. 5 and 6 are respective rear oriented and front-oriented perspective views of the sensor mounting bar for the AV yard truck of FIG. 1.
Figure 6:
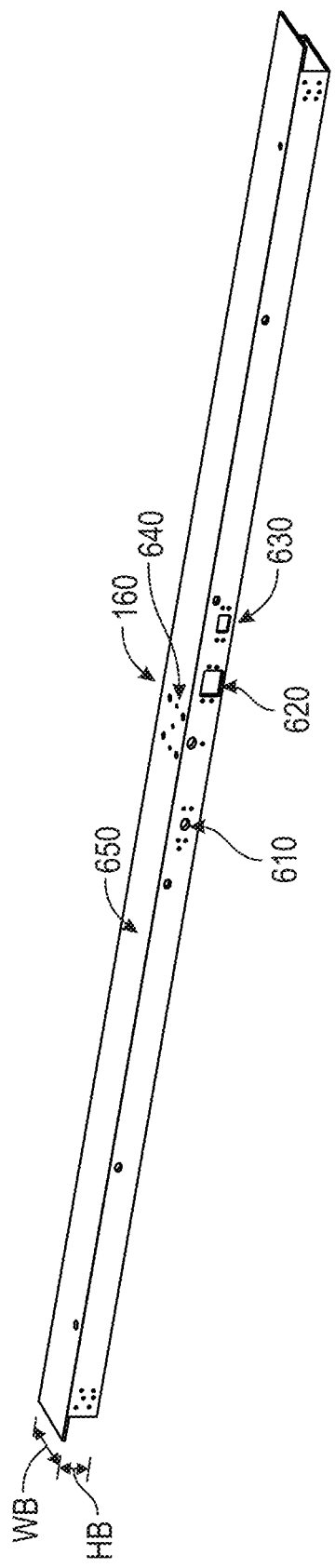
Figure 7:
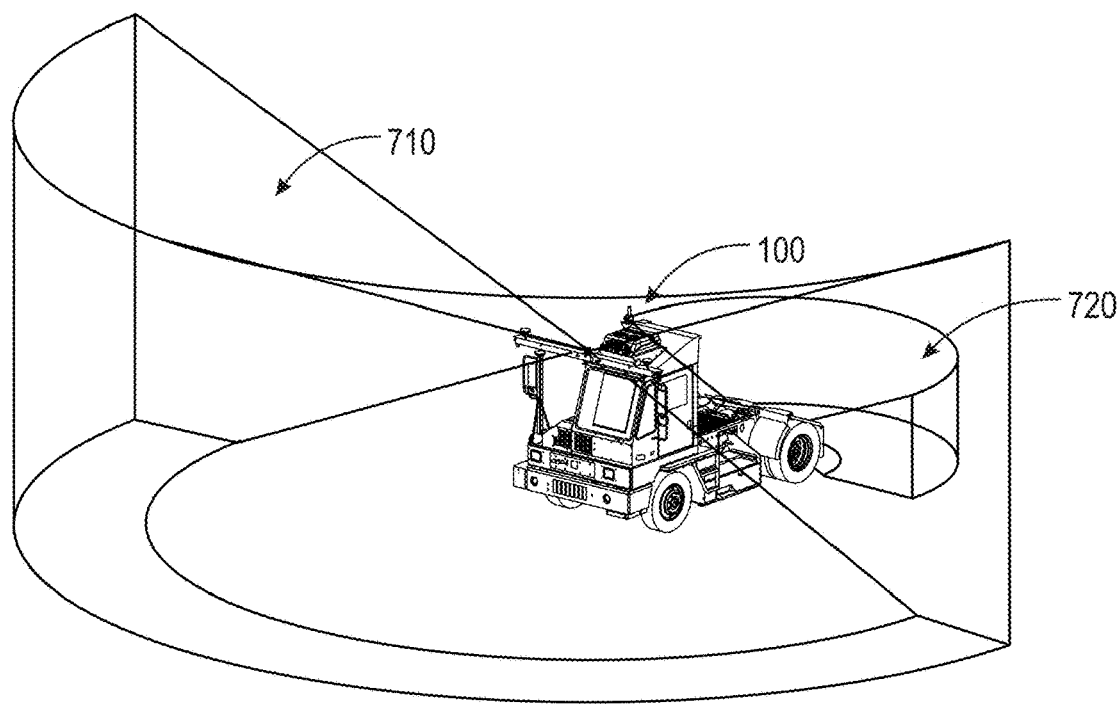
FIGS. 7-10 are respective front-oriented perspective, rear-oriented perspective, side and top views of the AV yard truck of FIG. 1 showing coverage for LIDAR sensors.
Figure 8:
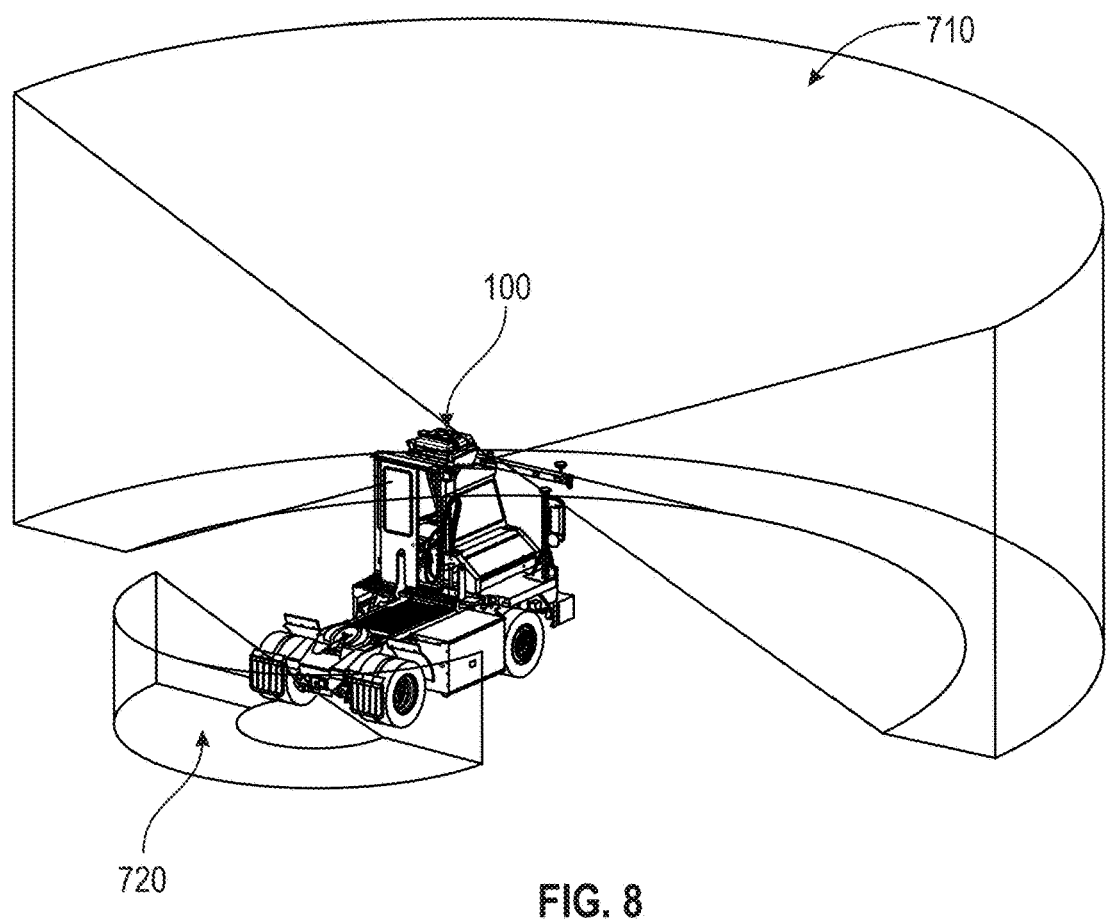
Figure 9:
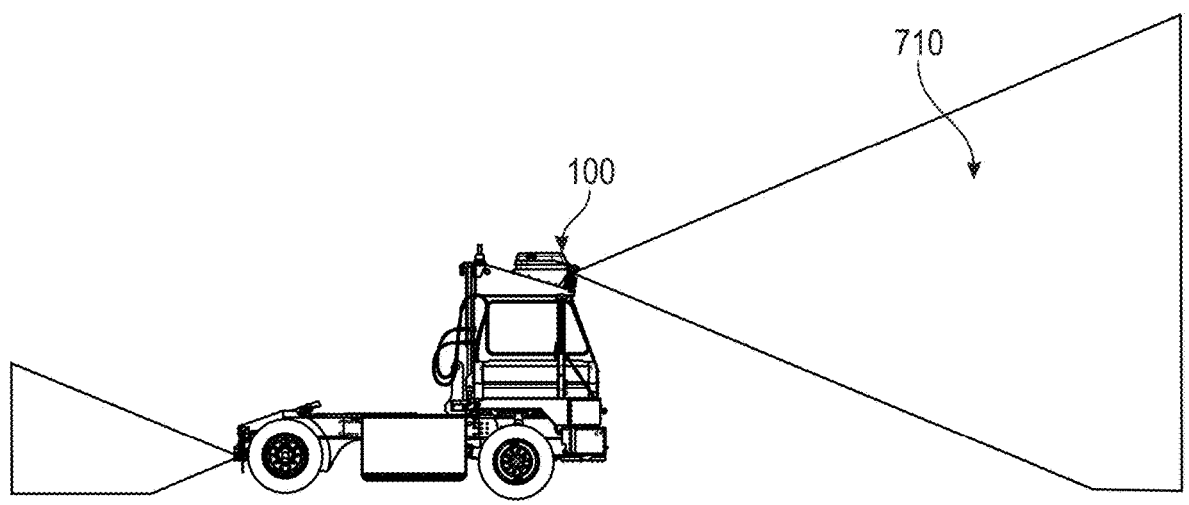
Figure 10:
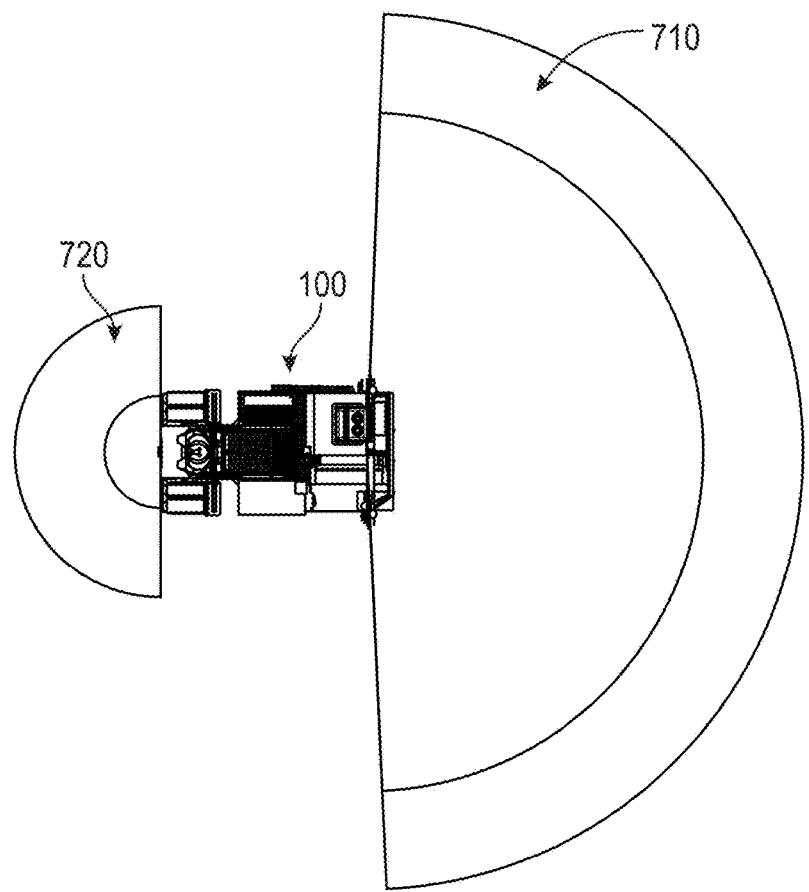
Figure 11:
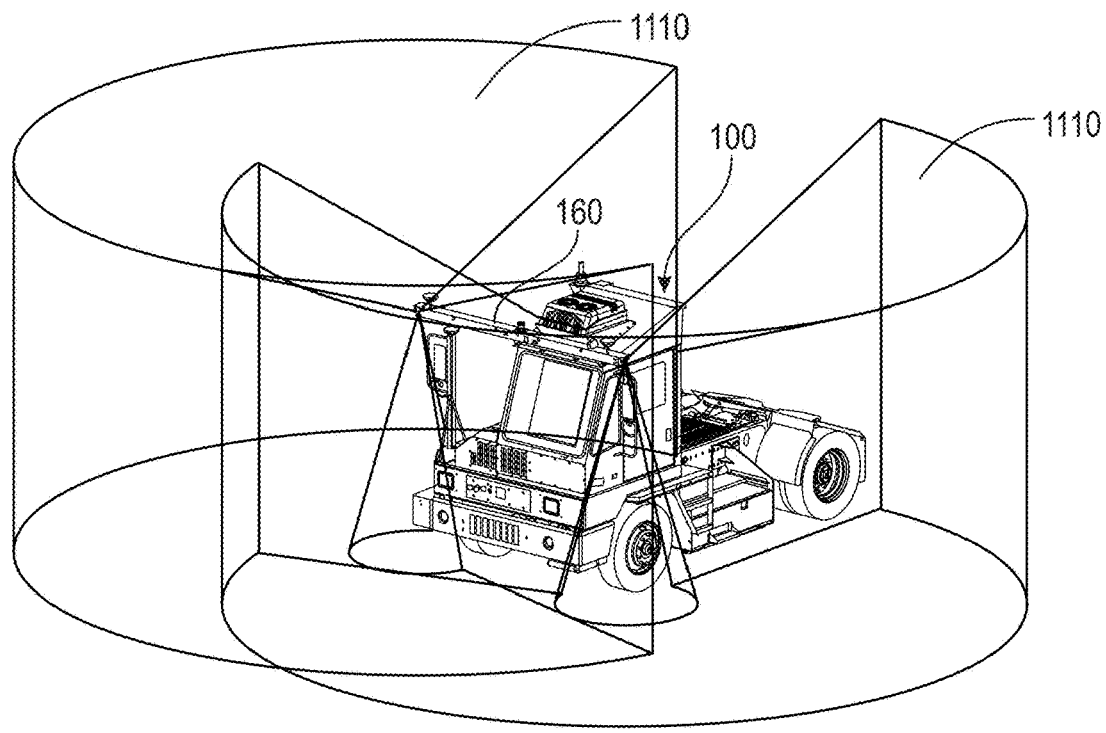
FIGS. 11-14 are respective front-oriented perspective, rear-oriented perspective, side and top views of the AV yard truck of FIG. 1 showing coverage for Waymo-based LIDAR sensors.
Figure 12:
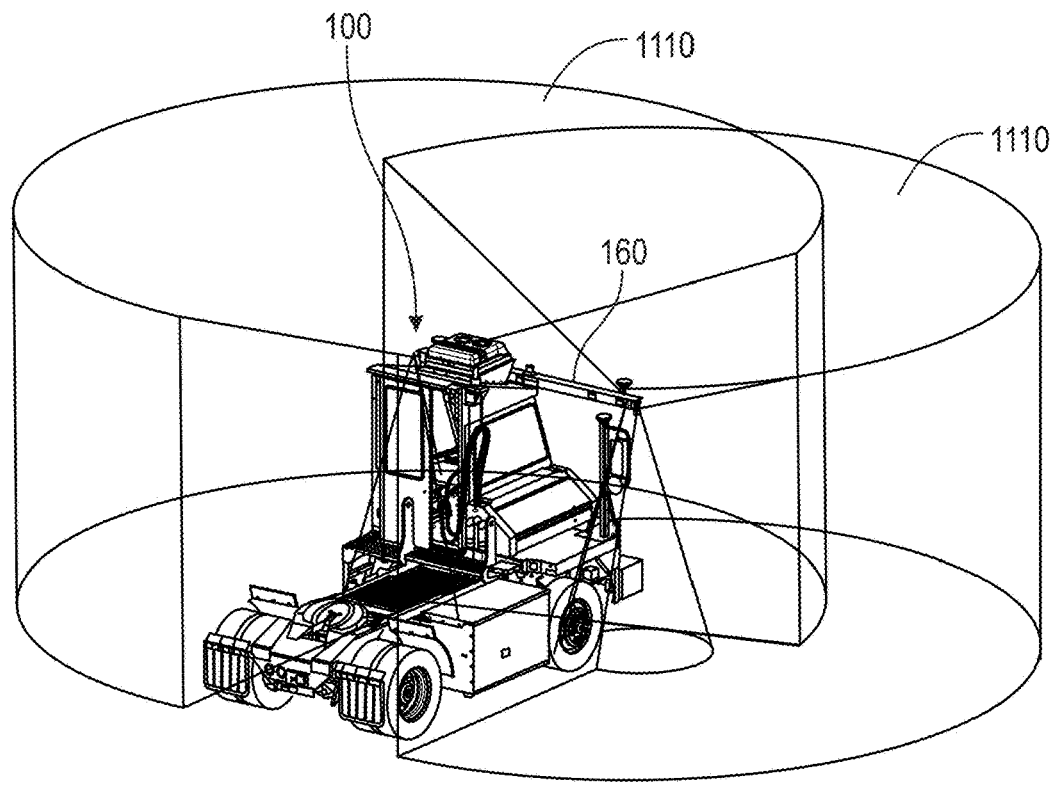
Figure 13:
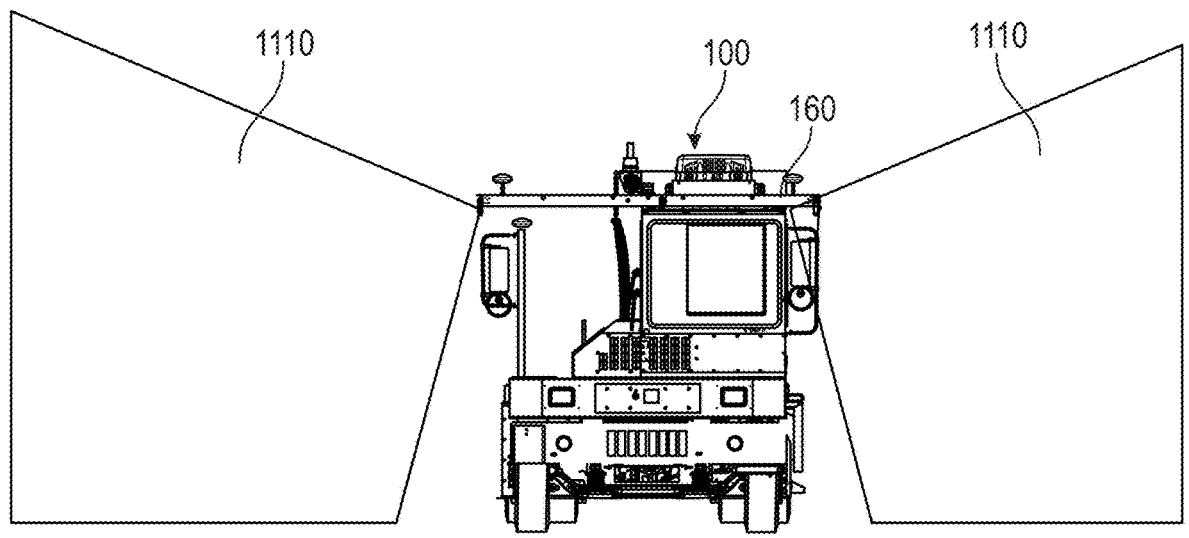
Figure 14:
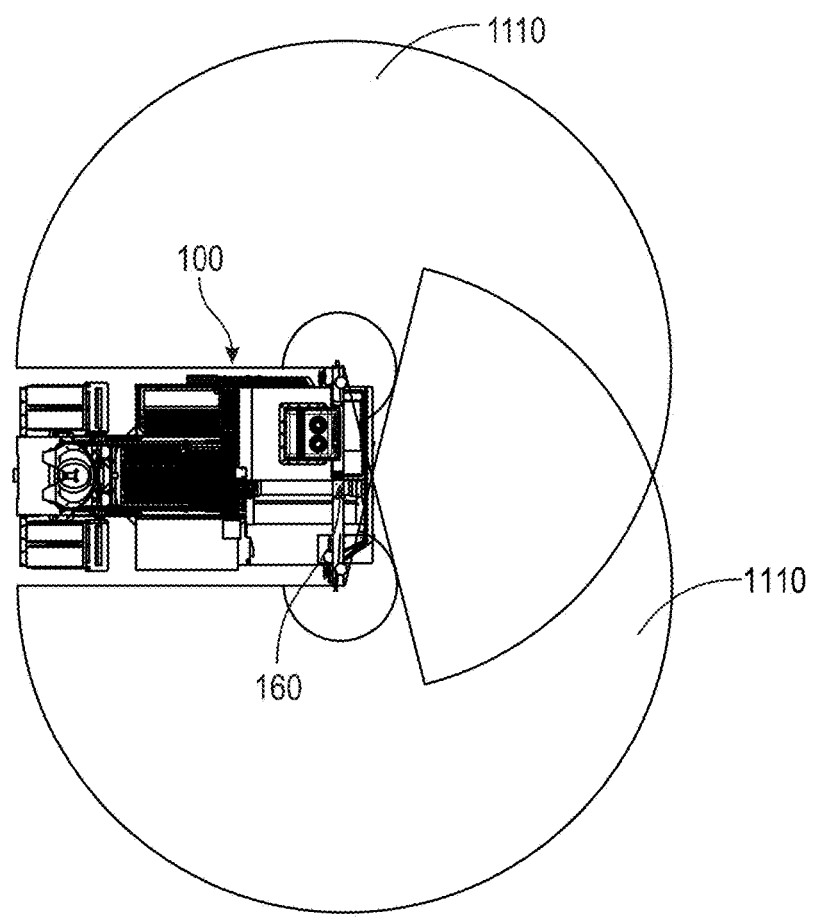

Certain sensors, described below, are advantageously mounted on a novel sensor bar 160, which is shown mounted with respect to the front, top edge of the roof of the cab 104 using appropriate brackets. With further reference to FIGS. 5 and 6, the sensor bar is shown in both rear perspective and front perspective views, respectively. The rear edge 500 of the bar 160 contains a series of slots 510 of varying lengths that allows for access to bracket bolts (see bolt holes 520), sensor wires, etc. The overall length LB of the exemplary bar 160 is approximately 115-120 inches (118 for example). The width (front-to-rear_WB of the bar 160 is approximately 6 inches and the Height HB of the bar 160 is approximately 4 inches. These dimensions can vary widely. The bar can be constructed from ¼ inch thick aluminum or steel alloy in various embodiments. Polymer or composite can be used in alternate embodiments. The bar 160 defines a rectangular cross section, but other shapes can be employed in alternate embodiments—for example and open U-shape, a T-shape, an ellipsoidal cross section, etc. The front edge 600 (FIG. 6) of the bar 160 can include slots for mounting various sensors. For example sensors S5, S4 and S6 described in the table below can be mounted respectively in front edge slots 610, 620 and 630. A set of bolt holes 640 is provided for mounting sensor S1 with respect to the top surface 650 of the bar 160 as described below.

The following table provides the type, location, orientation and additional parameters with respect to each mounted sensor S1-S20, shown on the AV yard truck 100 of FIGS. 1 and 2.

| Sensor # | Exemplary Manufacturer/Model(Type) | Sensor Location | Field of View (FOV) Azimuth | Field of View (FOV) Elevation | Additional Information |
|---|---|---|---|---|---|
| S1 | Ouster/OS1(LIDAR) | Front Sensor Mount - Centered | 360° | 45° (±22.5°) | Range: 120 m (80% reflectivity), 60 m (10% reflectivity) |
| S2 | Waymo/Honeycomb(LIDAR) | Front Sensor Mount - Right End | 360° | 95°(±21°, −74°) | Range: 50 m (80% reflectivity), 20 m (10% reflectivity) |
| S3 | Waymo/Honeycomb(LIDAR) | Front Sensor Mount - Left End | 360° | 95°(±21°, −74°) | Range: 50 m (80% reflectivity), 20 m (10% reflectivity) |
| S4 | Sekonix/SF3326(Vision) | Front Sensor Mount - Center/Left | 190° | 104° (±52°) | Resolution = 2.3M Pixel(1928 × 1208) |
| S5 | Entron/F008A030BMOA (Vision) | Front Sensor Mount - Center/Right | 29.8° | 16.8° (±84°) | Resolution = 8.3M Pixel(3840 × 2160) Focus Distance = 70 m |
| S6 | Entron/F008A120BMOA (Vision) | Front Sensor Mount = Center/Left | 122.6° | 67.92° (33 96°) | Resolution = 8.3M Pixel(3840 × 2160) Focus Distance = 4 m |
| S7 | Sekonix/SF3324(Vision) | Front Sensor Mount - Right End | 120° | 73° (±36 5°) | Resolution = 2.3M Pixel(1928 × 1208) |
| S8 | Sekonix/SF3326(Vision) | Front Sensor Mount - Right End | 190° | 104° (±52°) | Resolution = 2.3M Pixel(1928 × 1208) |
| S9 | Entron/F008A030BMOA | Front Sensor Mount - Right End | 29.5° | 16.8° (±84°) | Resolution = 8.3M Pixel(3840 × 2160) Focus Distance = 70 m |
| S10 | Sekonix/SF3324(Vision) | Front Sensor Mount - Left End | 120° | 73° (±36.5°) | Resolution = 2.3M Pixel(1928 × 1208) |
| S11 | Sekonix/SF3326(Vision) | Front Sensor Mount - Left End | 190° | 104° (±52°) | Resolution = 2.3M Pixel(1928 × 1208) |
| S12 | Entron/F008A030BMOA (Vision) | Front Sensor Mount - Left End | 29.5° | 16.8° (±84°) | Resolution = 8.3M Pixel(3840 × 2160) Focus Distance = 70 m |
| S13 | Waymo/Honeycomb(LIDAR) | Aft Cab Roof - Center | 360° | 95°(±21°, −74°) | Range: 50 m (80% reflectivity), 20 m (10% reflectivity) |
| S14 | Sekonix/SF3324(Vision) | Aft Cab Roof - Center | 120° | 73° (±36.5°) | Resolution = 2.3M Pixel(1928 × 1208) |
| S15 | Ouster/OS1(LIDAR) | Rear Bumper - Center | 360° | 45° (±22.5°) | Range: 120 m (80% reflectivity), 60 m (10% reflectivity) |
| S16 | Sekonix/SF3326(Vision) | Rear Bumper - Center | 190° | 104° (±52°) | Resolution = 2.3M Pixel(1928 × 1208) |
| S17 | Continental/ARS430(Radar) | Front Bumper | ±9°/ ±75° (Far/ Near) | 14°/20° (Far/ Near) | Range: Far Scan = 250 m/Near Scan = 100 m |
| S18 | Continental/ARS430(Radar) | Passenger Side | ±9°/ ±75° (Far/ Near) | 14°/20° (Far/ Near) | Range: Far Scan = 250 m/Near Scan = 100 m |
| S19 | Continental/ARS430(Radar) | Rear Bumper | ±9°/ ±75° (Far/ Near) | 14°/20° (Far/ Near) | Range: Far Scan = 250 m/Near Scan = 100 m |

| Sensor # | Exemplary Manufacturer/Model(Type) | Sensor Location | Field of View (FOV) | | Additional Information |
|---|---|---|---|---|---|
| | | | Azimuth | Elevation | |
| S20 | Continental/ARS430(Radar) | Driver Side | ±9°/ ±75° (Far/ Near) | 14°/20° (Far/ Near) | Range: Far Scan = 250 m/Near Scan = 100 m |

IV. Sensor Array Performance

FIGS. 7-42 variously depict the areas of coverage for sensors S1-S20 above. These coverage areas are approximate and exemplary, but provide a generalized description of the operation of such sensors as mounted on the AV yard truck in the respective positions listed in the table under "Sensor Location".

FIGS. 7-10 show the front coverage 710 and rear coverage 720 for respective LIDAR sensors and S15, which by way of non-limiting example, can be OS1 sensors and associated electronics available from Ouster, Inc. of San Francisco, CA. Note that the makes and models of any sensors described herein are only exemplary of a wide range of similar sensor types available from the same or other manufacturers, or custom built. These makes/models are meant to show the general performance parameter and/or coverage desired for effective AV truck operation.

Figure 16:
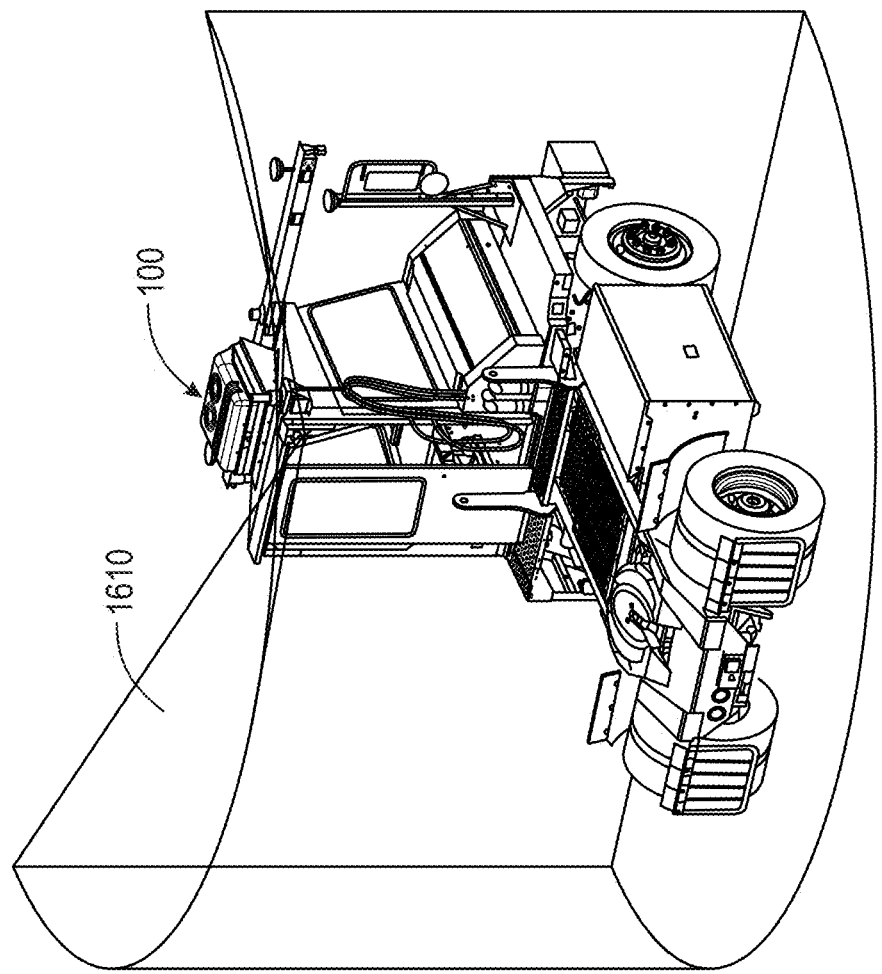
FIGS. 16 and 17 are respective rear oriented perspective and top views of the AV yard truck of FIG. 1, showing coverage for a rear-oriented Waymo-based LIDAR sensor.
Figure 17:
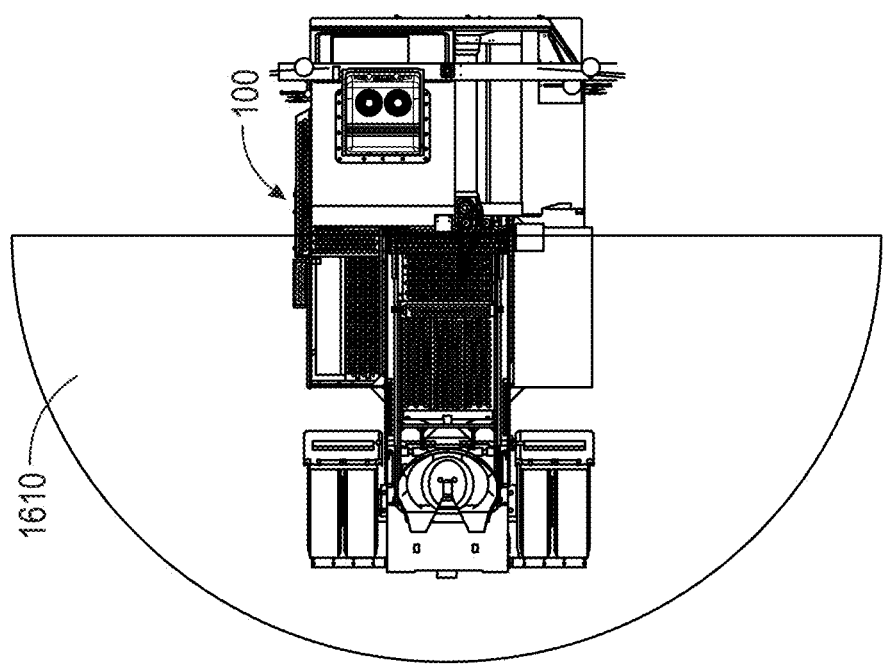
Figure 23:
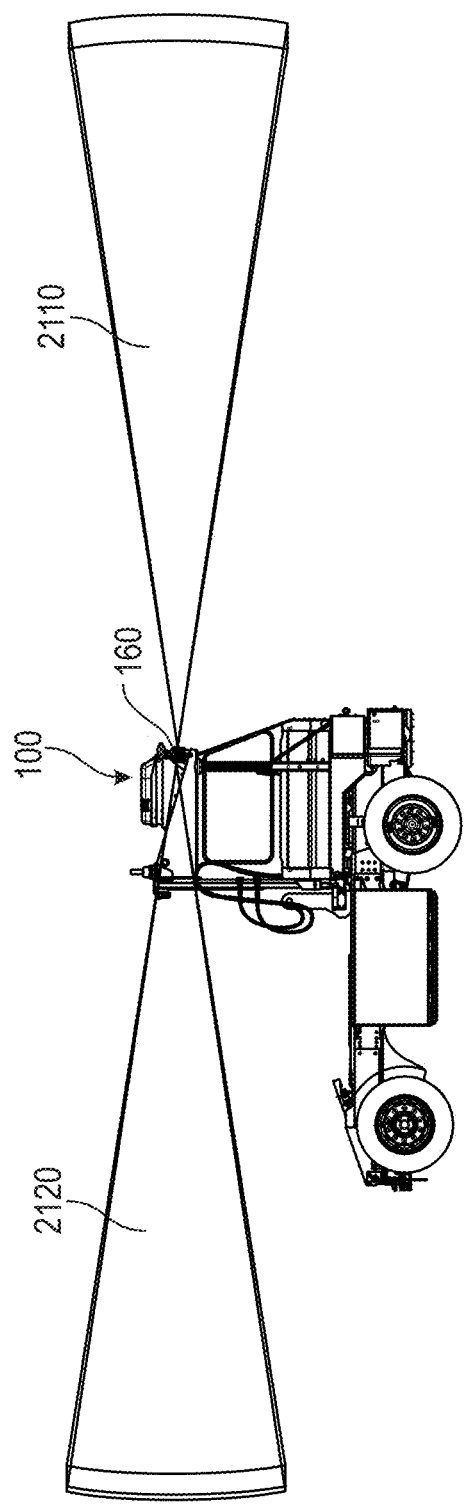
Figure 24:
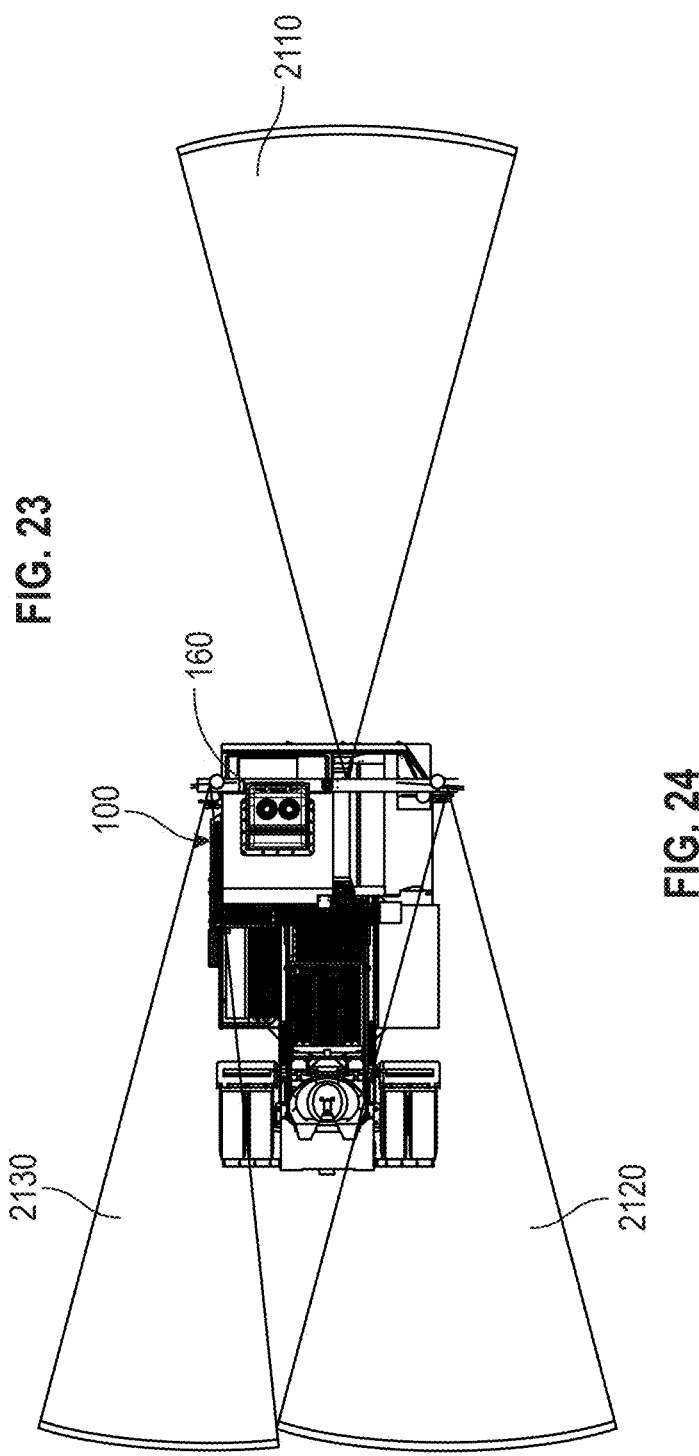
Figure 26:
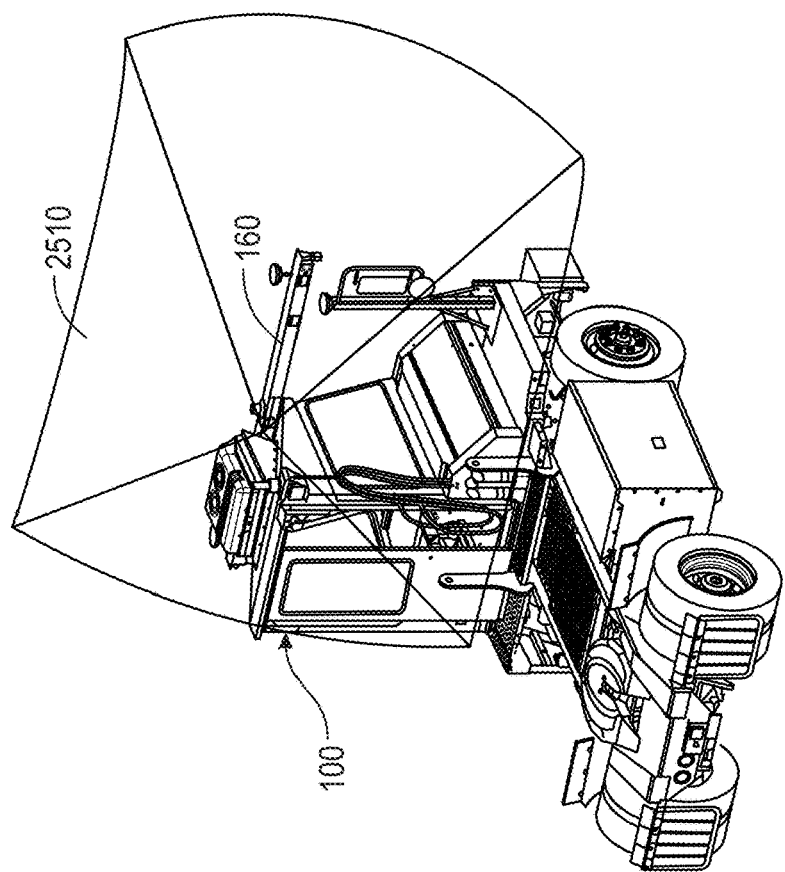
FIGS. 25-28 are respective front-oriented perspective, rear-oriented perspective, side and top views of the AV yard truck of FIG. 1 showing FOVs for a front-facing, bar-mounted visual camera sensor and associated optics.
Figure 25:
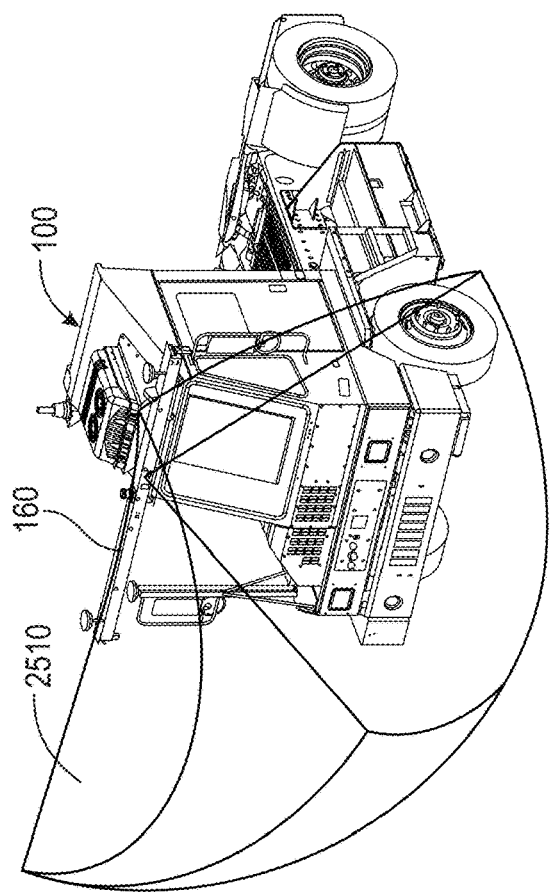
Figure 27:
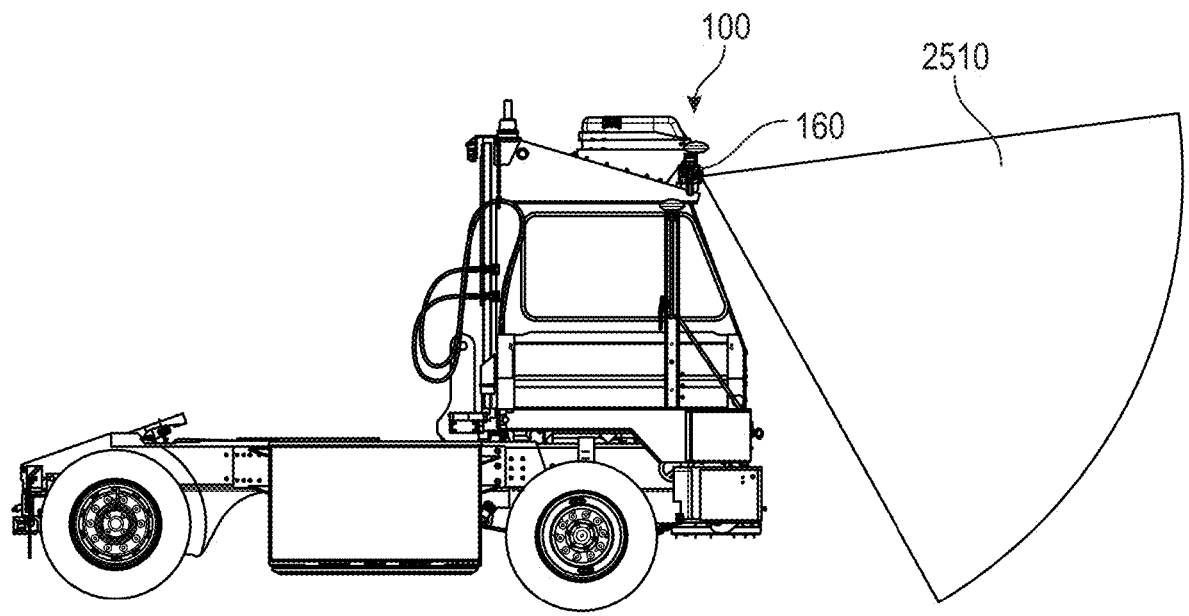
Figure 28:
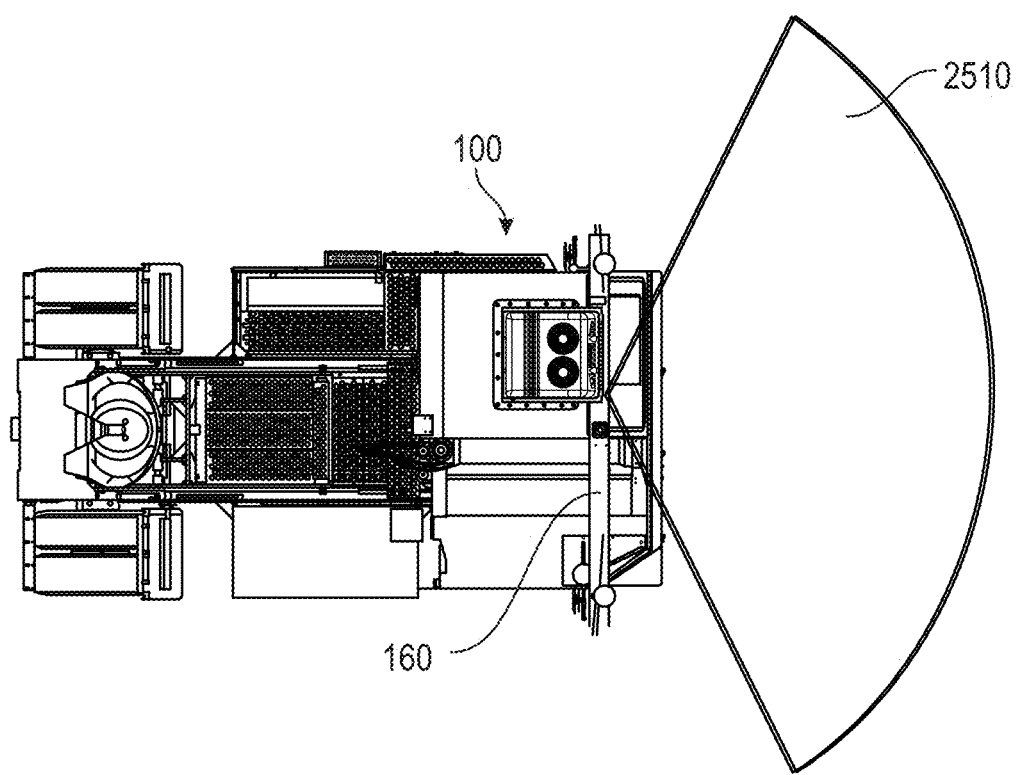
Figure 29:
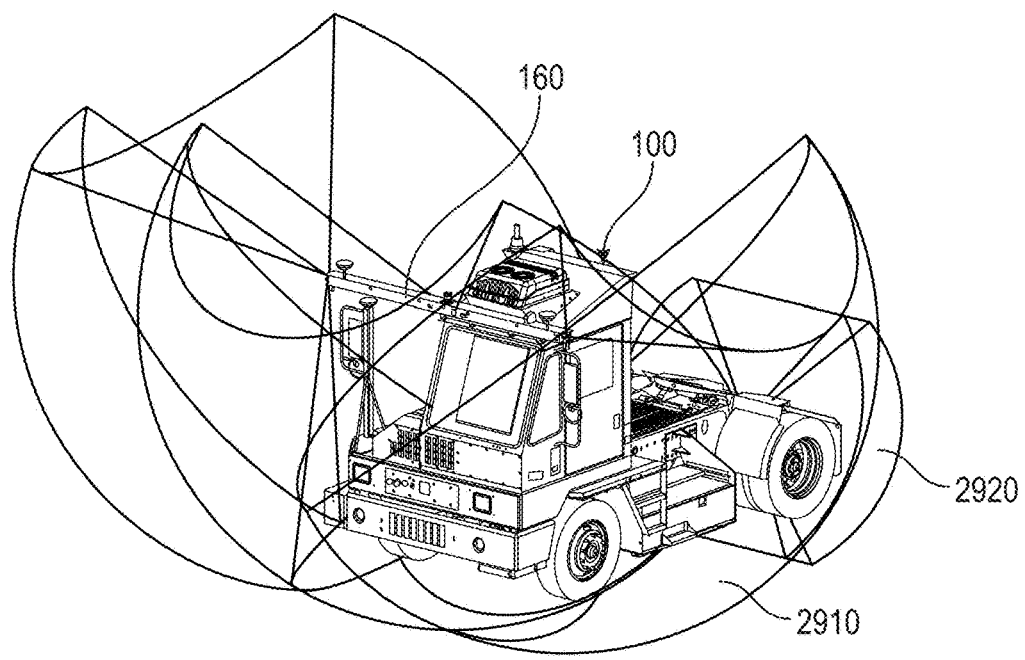
FIGS. 29-33 are respective front-oriented perspective, rear-oriented perspective, side, front and top views of the AV yard truck of FIG. 1 showing FOVs for a plurality of perimeter-coverage, visual camera sensors and associated optics.
Figure 30:
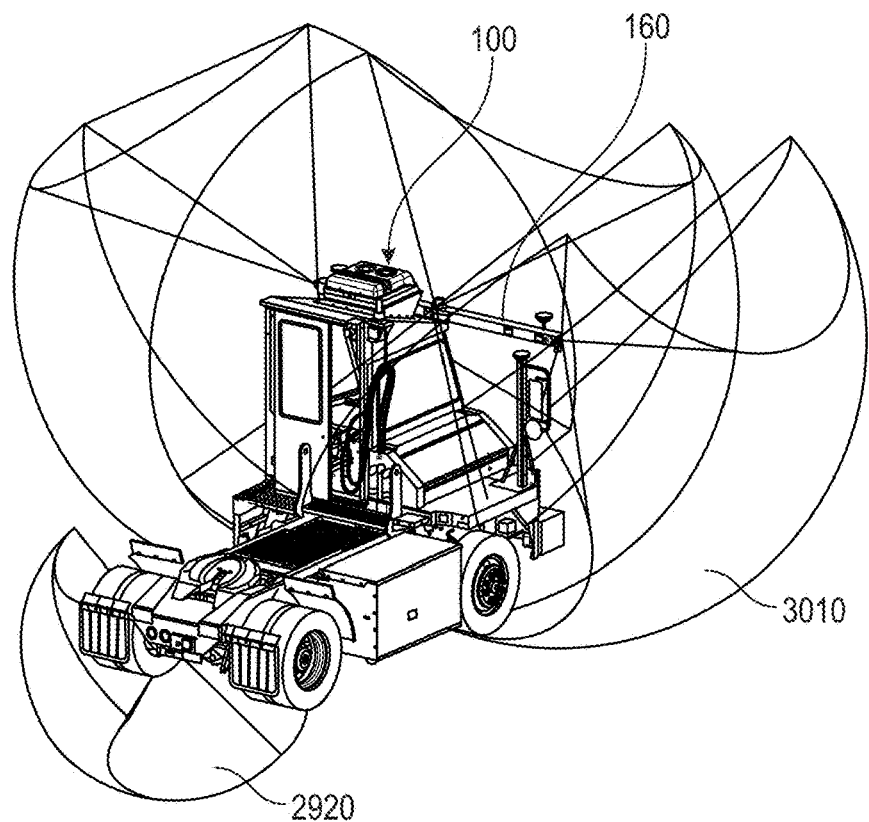
Figure 31:
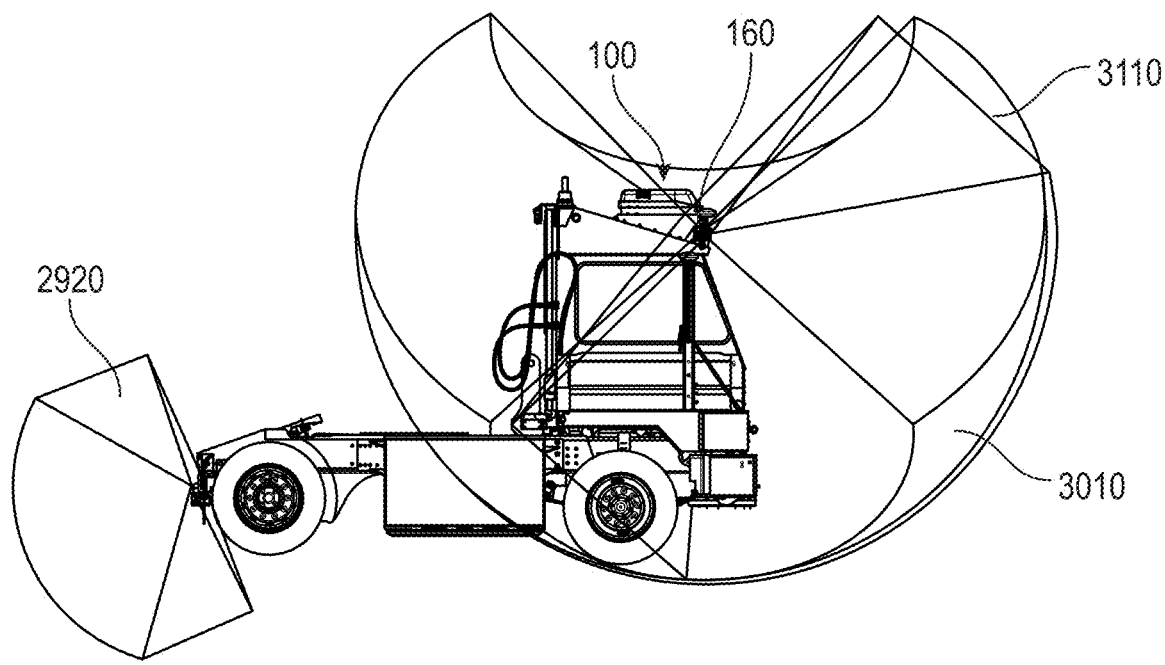
Figure 32:
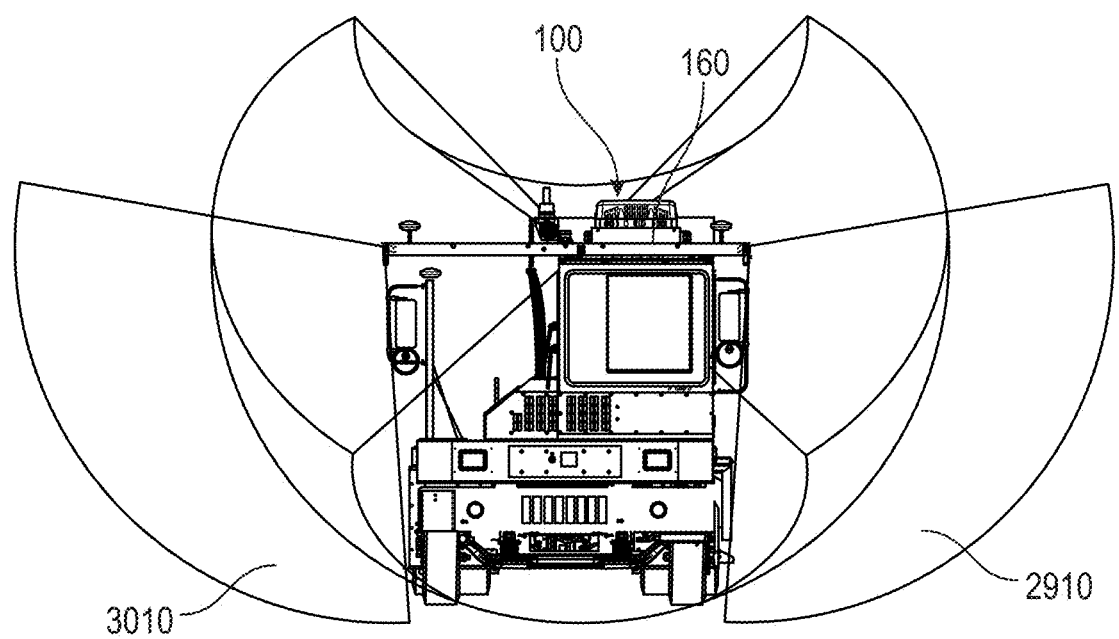
Figure 33:
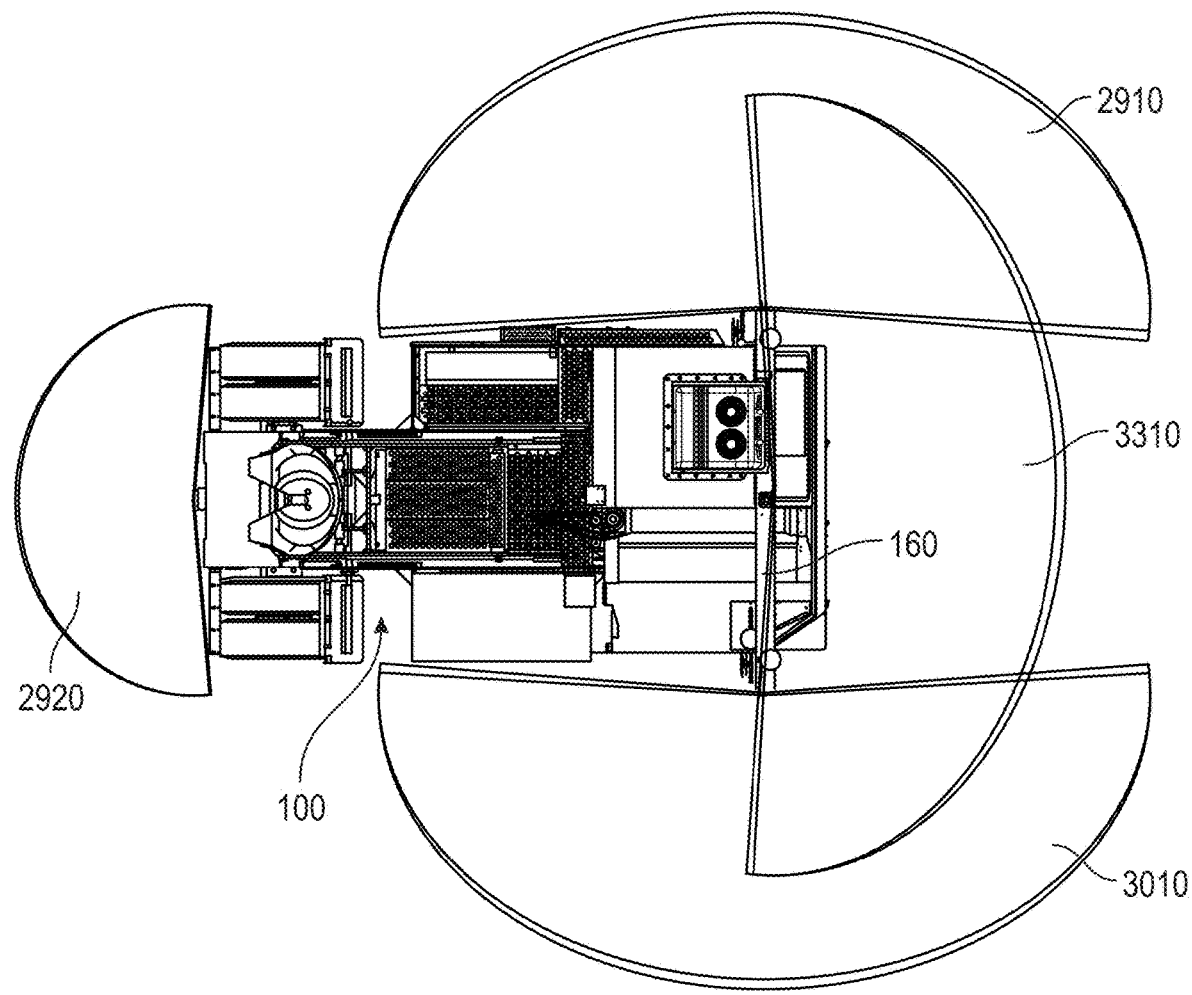
Figure 34:
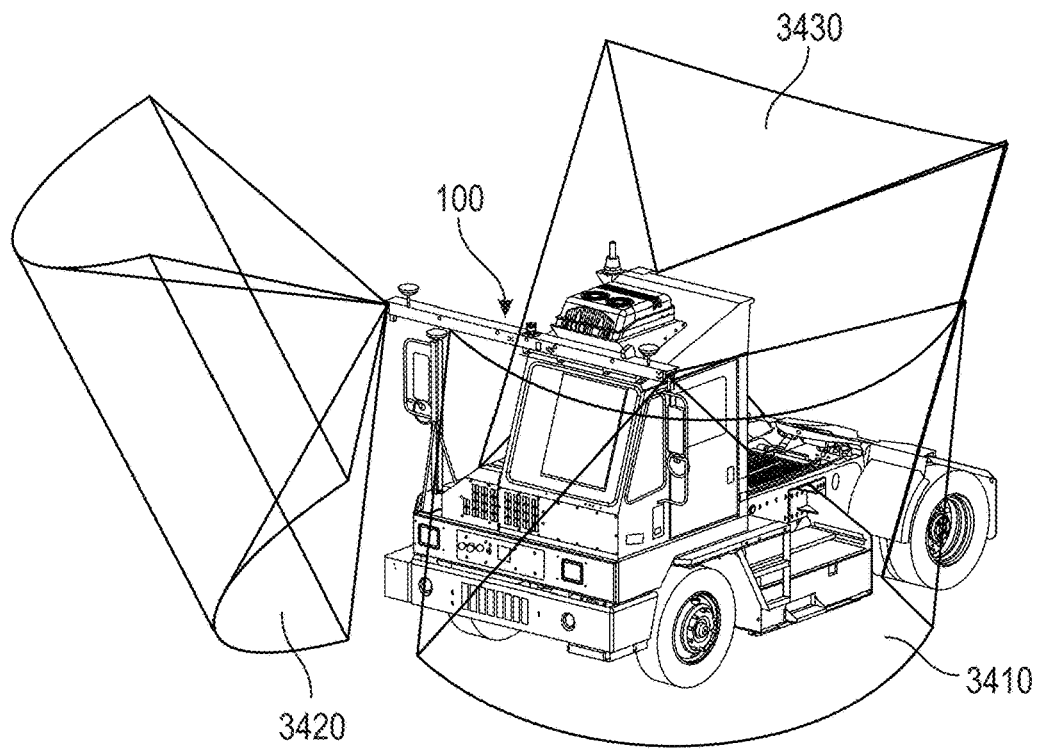
FIGS. 34-37 are respective front-oriented perspective, rear-oriented perspective, top and side views of the AV yard truck of FIG. 1 showing FOVs for a pair of front-facing, bar-end-mounted and rear-facing, cab-top mounted visual camera sensor and associated optics.
Figure 35:
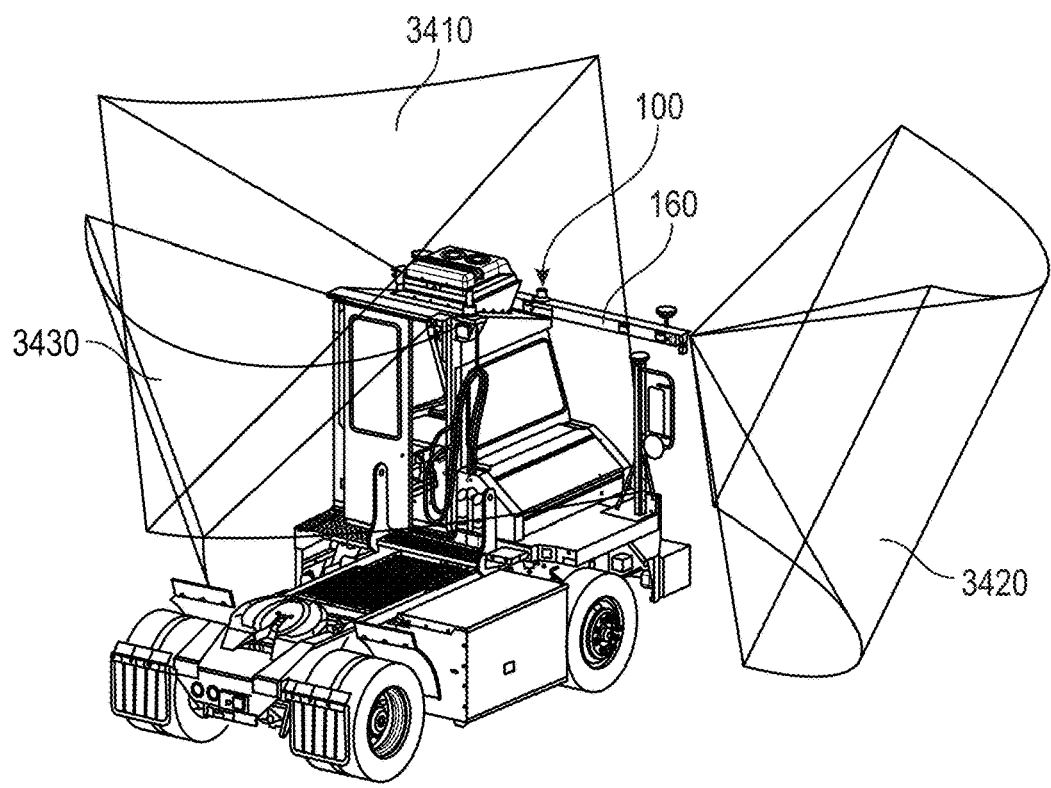
Figure 36:
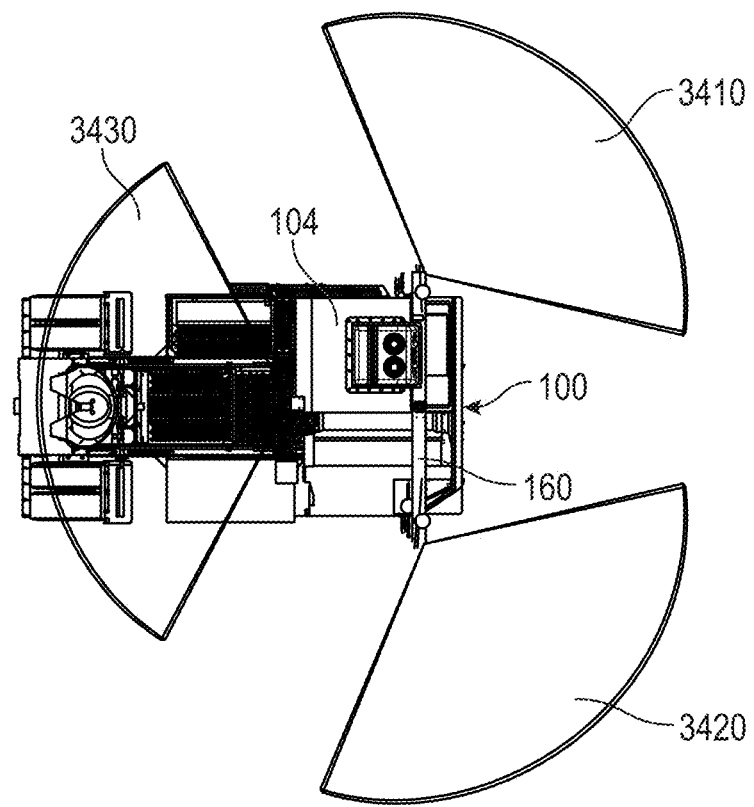
Figure 37:
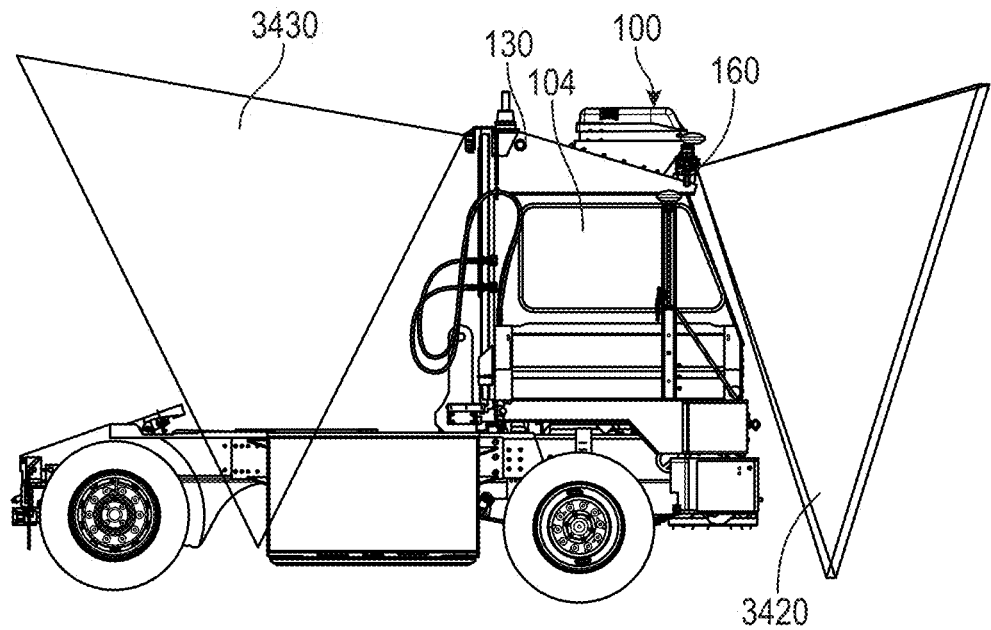
Figure 38:
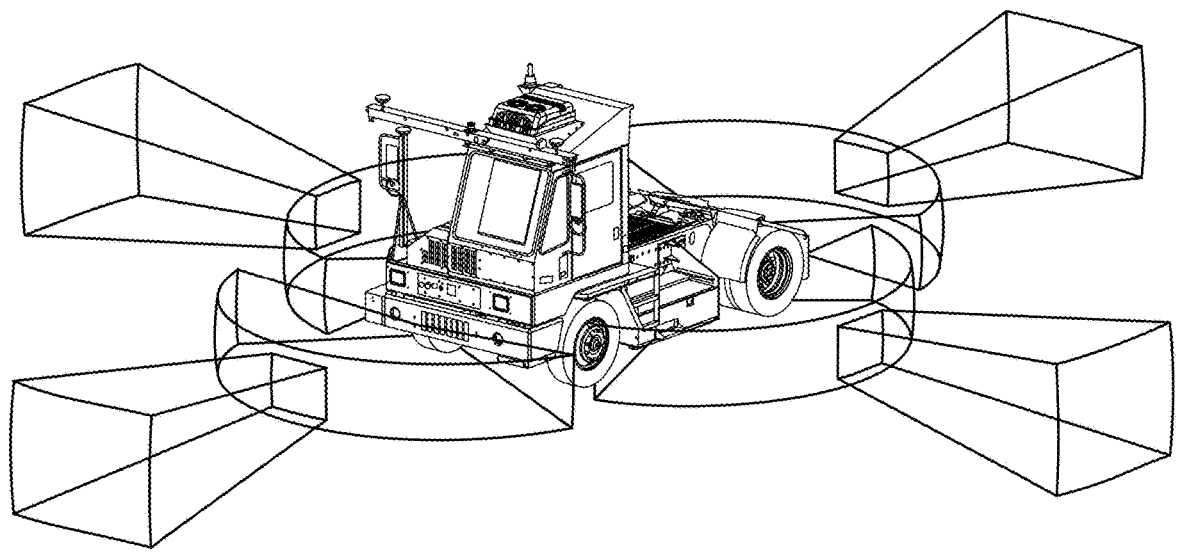
FIGS. 38-42 are respective front-oriented perspective, rear-oriented perspective, side, front and top views of the AV yard truck of FIG. 1 showing short-range and long-range coverage for four 90-degree-offset, chassis-mounted radars.
Figure 39:
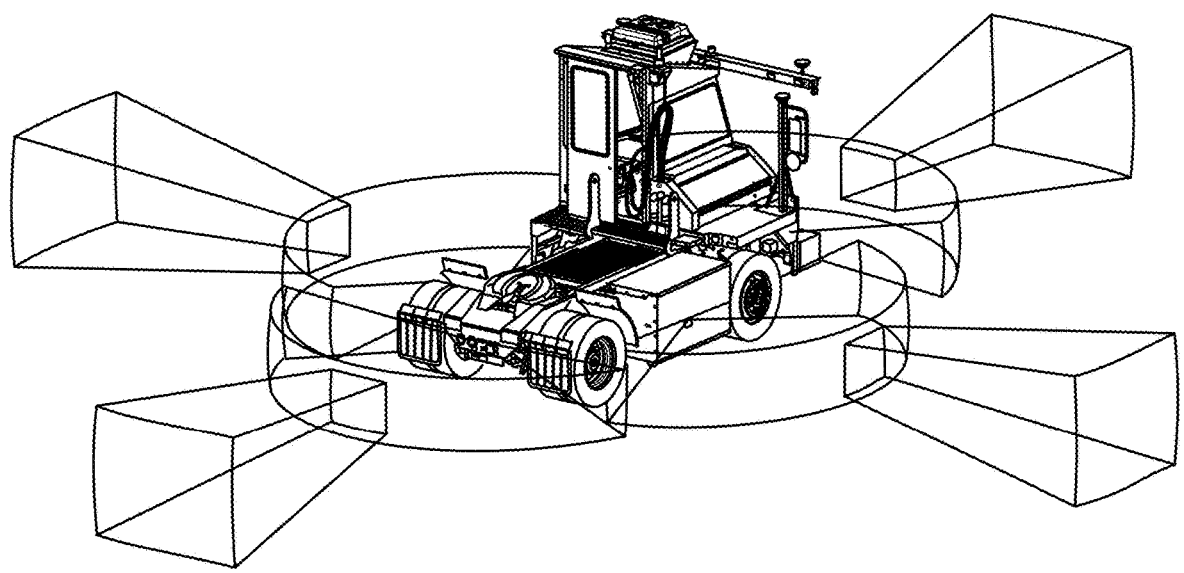

FIGS. 11-14 depict the coverage 1110 for exemplary Waymo-based LIDAR sensor's S2 and S3 on the front corners of the truck 100. These sensors are located on opposing ends of the sensor bar 160. Additionally, FIGS. 16 and 17 depict the rear-mounted Waymo-based LIDAR sensor S13 and its coverage 1610.

Figure 15:
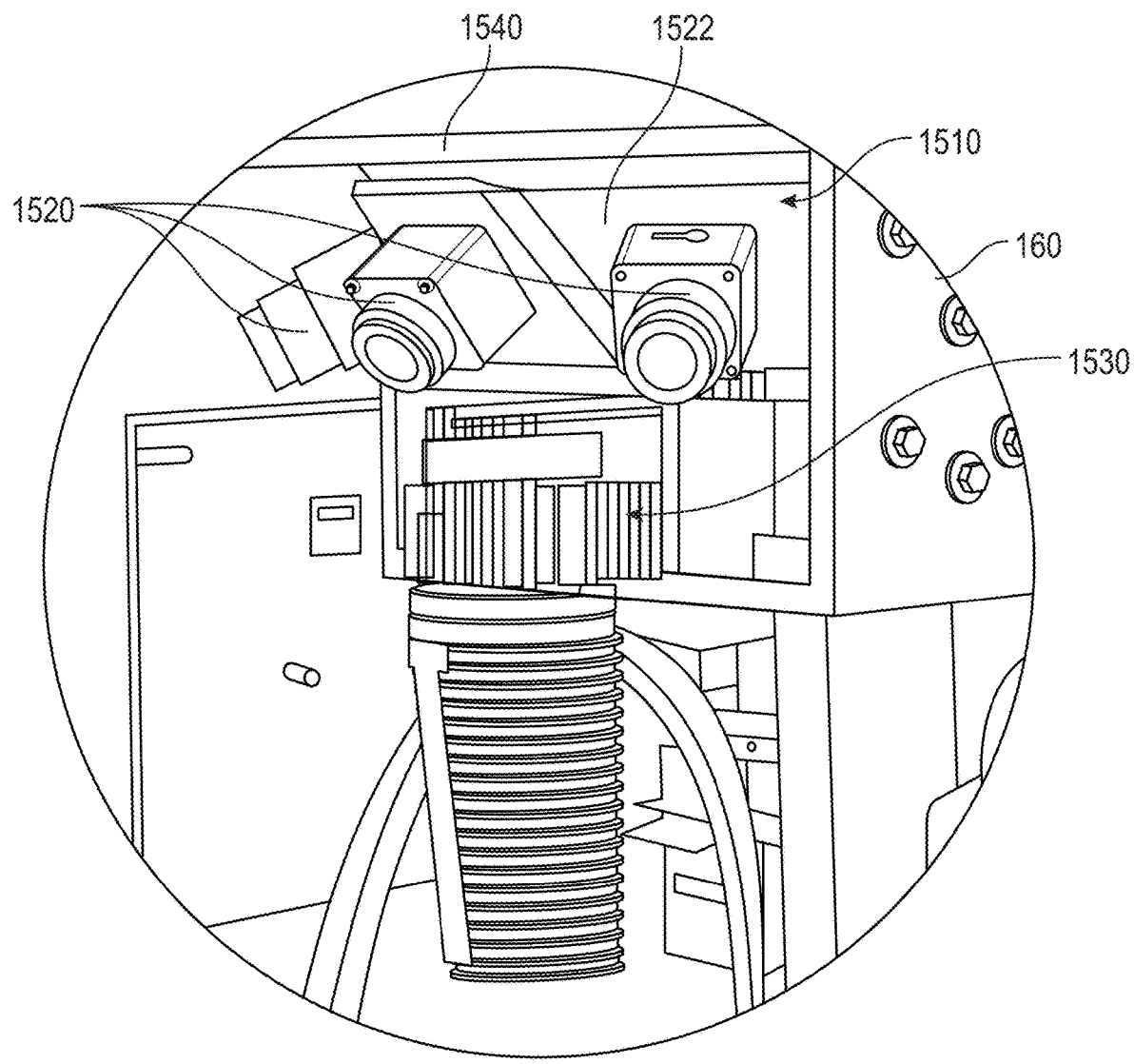
FIG. 15 is a fragmentary perspective view of an end of the sensor mounting bar for the AV yard truck of FIG. 1, showing the arrangement of LIDAR and visual camera sensors with respect thereto.

FIG. 15 shows the exemplary mounting arrangement on the right end 1510 of the bar 160. As shown, the Waymo-based LIDAR honeycomb sensor 1530 (S2 herein) is mounted against the end of the bar, using appropriate fastening arrangements, in a relative unobtrusive, and unobstructed manner. Above this sensor, on a tilted mounting bracket 1522 are three visual-light cameras 1520 (described further below), that provide a front-angled, side and rear-angled FOVs. The top surface of the bar 160 defines a slight overhang 1540 that helps to protect the camera's from the elements. While not shown, the cameras herein can be covered by light-transmitting covers (e.g. bubbles) that further protect them from the elements. Mountings on the bar 160 can be provided to secure such protective covers.

FIGS. 18 and 19 depict the combined LIDAR coverage 710, 720, 1110 and 1610 provided by both the Ouster and Waymo-based sensors described above. Note that the area of coverage provided effectively extends from the ground to a significant height above the truck roof in all directions, thereby ensuring clearance from objects and obstructions as the truck is in motion, and assisting in locating objects of interests, such as trailers and loading docks.

FIGS. 21-24 depict visual-light, machine vision-based camera sensor S5, S9 and S12—for example available from Entron. These cameras are each mounted on the bar 160, with a single centered camera providing a forward FOV 2110 and two opposing rear-facing cameras on each end of the bar 160 providing FOVs 2120 and 2130. Note that the rearward FOV 2130 is slightly occluded by the cab 104, but ample sensing form other visual cameras described herein can ensure appropriate coverage.

FIGS. 25-28 depict the FOV 2510 for front-viewing camera sensor S6, which is also centered on the bar 160. This camera (which, by way of example, is available from Entron) provided a short, wide FOV in front of the truck.

FIGS. 29-33 depict the FOVs of a series of camera sensors S4, S8, S11 and S16 (available from Sekonix Co. Ltd. Of the Republic of Korea) that provide perimeter coverage with one located at the rear bumper (S16) to assist in hitching to trailers and there located at the ends and center of the bar 160. The resulting FOVs 2910, 2920, 3010 and 3310 are shown variously, and provide substantial front and side cooperage as well and lower rear coverage.

FIGS. 34-37 depict FOVs for camera sensors S7, S10 and S14 (also available from Sekonix), which define FOVs 3410, 3420 and 3430. The front FOVs 3410, 3420 emanate from the ends of the bar 160, while the rear FOV 3430 is directed downwardly and emanates from the top rear center of the cab 104, and can be part of the rear of the cowling 130. The rear FOV 3430 can assist in hitching the trailer in an autonomous manner.

Figure 40:
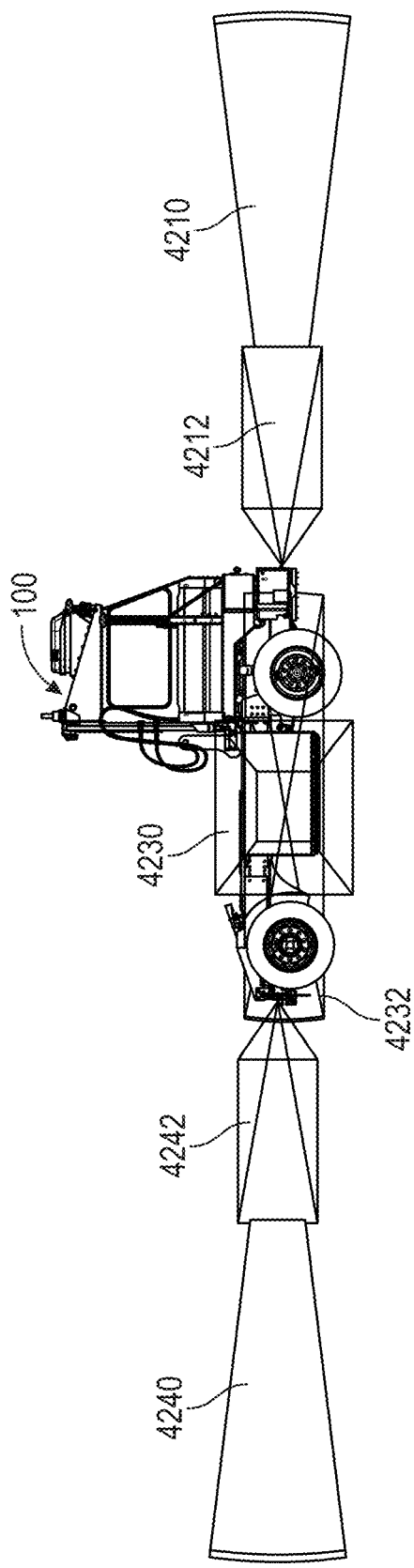
Figure 41:
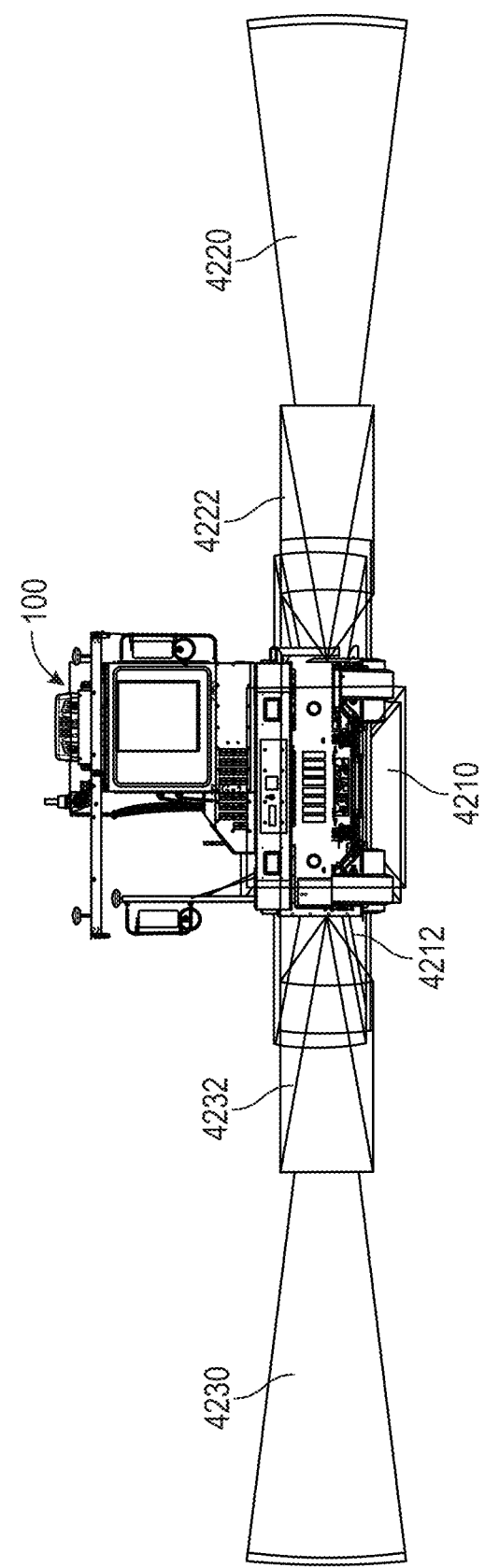
Figure 42:
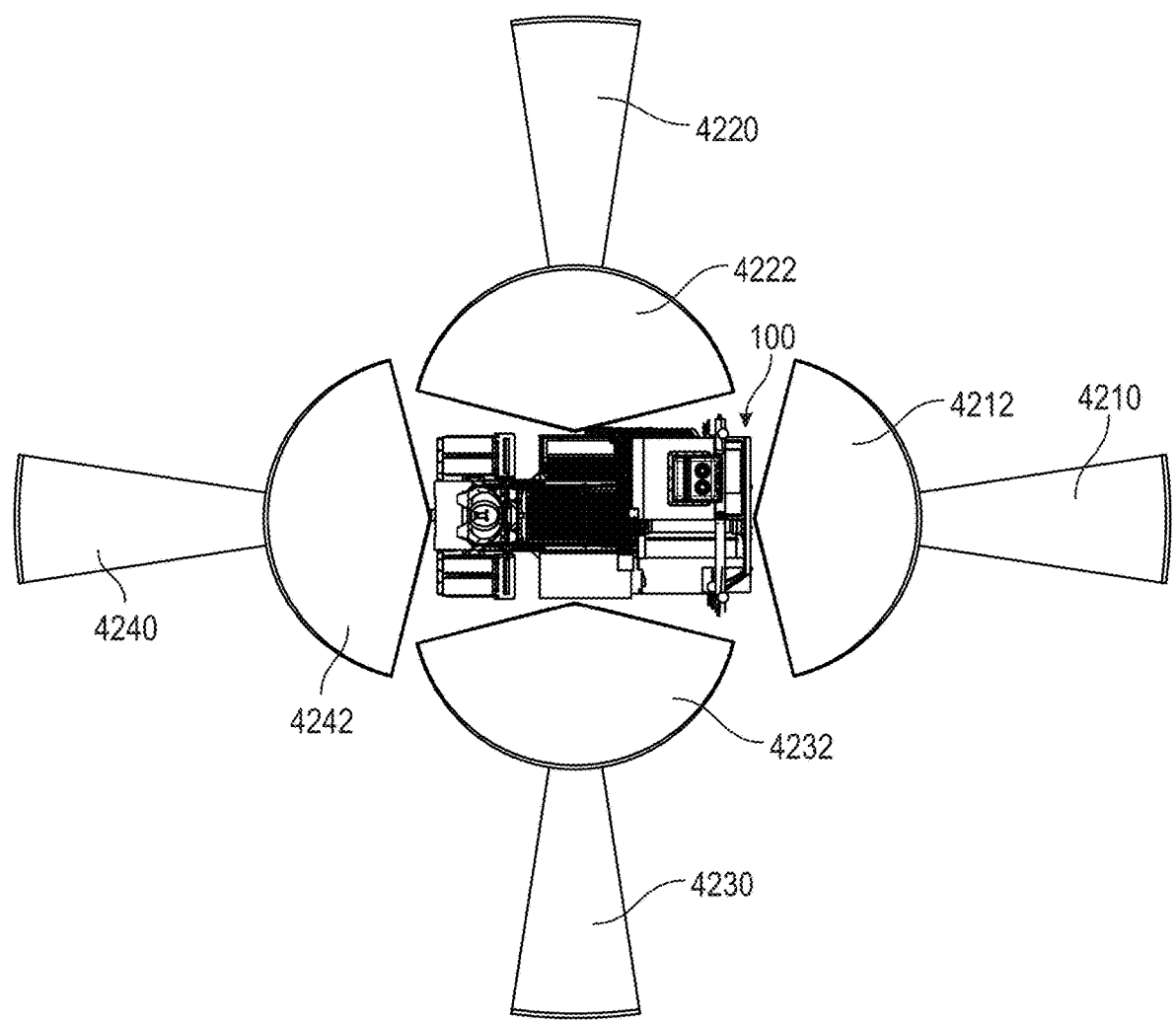

FIGS. 40-42 depict coverage areas for a set of four chassis-mounted (low) radar sensors S17, S18, S19 and S20 (available, for example, from Continental AG of Germany). The sensors are mounted, respectively on the front, right side, rear and left side at approximately 90-degree perimeter offsets. As such they generate a close-in coverage 4212, 4232, 4242 and 4222 (respectively) that substantially encircles the truck. At longer ranges, a narrower coverage envelope 4210, 4230, 4240 and 4220 is provided. These radars assist in navigation and obstacle avoidance as well and range finding to objects and trailers.

IV. Conclusion

It should be clear that the above-described arrangement of processing and control components and sensors provides a novel, robust, redundant and weather resistant approach to outfitting an AV truck with needed telemetry-gathering components and the processors required to handle input sensor telemetry. This approach avoids obtrusive projections and arms that may interfere with operation and/or case damage or injuries to personnel. The sensor mounting locations provided are well also suited to providing good visibility and points of view for sensing components.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the depicted sensor coverage areas are exemplary and can vary based upon the type of sensor and particular environment in which the truck is expected to operate. More or fewer sensors, or differing models, of particular sensor types, can be employed in alternate implementations. Also, the term "visible" or "visual" in the context of camera sensors should be taken broadly to include non-visible wavelengths, such as ultraviolet (UV) and infrared (IR) likewise, the cameras can include integrated or separate illumination assemblies capable of night-vision, where appropriate. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A sensor array for an autonomous vehicle (AV) truck having a chassis, cab and cab roof comprising:
a sensor mounting bar, disposed laterally with respect to a top side of the cab, the sensor mounting bar including a plurality of sensors mounted thereon so as to cover a plurality of points of view relative the AV truck, wherein the sensor mounting bar comprises opposing vertically oriented ends and wherein at least one of the plurality of sensors is mounted against one of the opposing vertically oriented ends of the sensor mounting bar providing a subset of the plurality of points of view, the subset including one or more of frontward, sideways and rearward points of view.

2. The sensor array as set forth in claim 1, wherein the plurality of sensors include visual camera sensors and LIDAR sensors.

3. The sensor array as set forth in claim 2, wherein the sensor mounting bar defines a hollow structure and at least one of plurality of sensors is recessed thereinto.

4. The sensor array as set forth in claim 2, wherein at least one of the opposing ends of the sensor mounting bar support at least some of the LIDAR and visual camera sensors at a desired orientation.

5. The sensor array as set forth in claim 2, wherein each of the opposing ends of the sensor mounting bar include, mounted thereon, at least some of the visual camera sensors directed at least one of forwardly, rearwardly and sideways relative to dimensions of the AV truck, and at least one LiDAR sensor on each of the opposing ends.

6. The sensor array as set forth in claim 2, wherein at least some of the plurality of sensors are located with respect to a top surface of the sensor mounting bar.

7. The sensor array as set forth in claim 2, wherein the opposing ends of the sensor mounting bar overhang top side edges of the cab in manner free-of interference with exterior obstructions.

8. The sensor array as set forth in claim 7, wherein the opposing ends of the sensor mounting bar are spaced apart at between approximately 115 and 120 inches.

9. The sensor array as set forth in claim 2, wherein the cab supports, adjacent to a top rear, at least one rear-facing visual camera sensor.

10. The sensor array as set forth in claim 2, wherein at least one of the plurality of sensors is directed rearwardly and operatively connected with processors arranged to hitch, unhitch, connect and disconnect service lines with respect to a trailer.

11. The sensor array as set forth in claim 2, wherein the plurality of visual camera sensors include close proximity visual camera sensors and longer range visual camera sensors directed in approximately similar directions.

12. The sensor array as set forth in claim 2, wherein the plurality of visual camera sensors provide image data to a machine vision system that recognizes imaged features and provides imaged features to autonomous controllers that direct motion and operation of the AV truck.

13. The sensor array as set forth in claim 1, further comprising, a cab roof-mounted rack that supports a plurality of controller and processor electronics packages, that support autonomous control and operations by the AV truck, operatively connected to the plurality of sensors, the rack being covered by a weatherproof cowling.

14. The sensor array as set forth in claim 1, further comprising, at least one rear-facing visual camera sensor located adjacent to a rear bumper of the chassis.

15. The sensor array as set forth in claim 1, further comprising at least four radar sensors located on each of a front, rear and opposing sides of the chassis at approximately 90-degree facing offsets therebetween.

16. The sensor array as set forth in claim 15, wherein the radar sensors define a larger/wider arcuate coverage region at a closer distance, and a smaller/narrower arcuate coverage region at a further distance, from the respective of the radar sensors.

17. The sensor array as set forth in claim 1, further comprising one or more visual camera sensor(s) mounted with respect to the AV truck to define a field of view FOV directed rearwardly to image features of a trailer so as to assist in hitching to a trailer.

18. The sensor array as set forth in claim 17, wherein the one or more visual camera comprise at least two cameras each with a discrete FOV.

19. The sensor array as set forth in claim 18, wherein the at least two cameras are located on the sensor mounting bar.

20. An autonomous vehicle (AV) truck having a chassis, cab and cab roof comprising:
a cab roof-mounted rack that supports a plurality of controller and processor electronics packages, that support autonomous control and operations by the truck, operatively connected to a plurality of sensors, the rack being covered by a weatherproof cowling and comprising opposing vertically oriented ends and wherein at least one of the plurality of sensors is mounted to one of the opposing vertically oriented ends of the rack providing a subset of a plurality of points of view, the subset including one or more of frontward, sideways, and rearward points of view.

* * * * *